(12) United States Patent
Yoshida

(10) Patent No.: US 9,041,894 B2
(45) Date of Patent: May 26, 2015

(54) LIQUID-CRYSTAL DISPLAY DEVICE

(75) Inventor: Masahiro Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 457 days.

(21) Appl. No.: 13/576,007

(22) PCT Filed: Feb. 1, 2011

(86) PCT No.: PCT/JP2011/052020
§ 371 (c)(1),
(2), (4) Date: Jul. 30, 2012

(87) PCT Pub. No.: WO2011/096390
PCT Pub. Date: Aug. 11, 2011

(65) Prior Publication Data
US 2012/0307172 A1 Dec. 6, 2012

(30) Foreign Application Priority Data
Feb. 4, 2010 (JP) ................................. 2010-023521

(51) Int. Cl.
G02F 1/1339 (2006.01)
G02F 1/1343 (2006.01)
(Continued)

(52) U.S. Cl.
CPC .... *G02F 1/133707* (2013.01); *G02F 1/134309* (2013.01); *G02F 2201/123* (2013.01);
(Continued)

(58) Field of Classification Search
CPC .............. G02F 1/133707; G02F 1/134309; G02F 2201/123; G02F 1/133512; G02F 2001/13712; G02F 1/13394; G02F 1/136213; G02F 2001/133742; G02F 1/133788
USPC ............. 349/39, 43, 110, 129, 143, 144, 155, 349/156; 345/92
See application file for complete search history.

(56) References Cited

U.S. PATENT DOCUMENTS 6,661,488 B1  12/2003  Takeda et al.
(Continued)

FOREIGN PATENT DOCUMENTS

JP  11-242225 A  9/1999
(Continued)

OTHER PUBLICATIONS

English translation of Official Communication issued in corresponding International Application PCT/JP2011/052020, mailed on Sep. 27, 2012.
(Continued)

*Primary Examiner* — Dung Nguyen
*Assistant Examiner* — Tai Duong
(74) *Attorney, Agent, or Firm* — Keating & Bennett, LLP

(57) ABSTRACT

One of the objects of the present invention is to provide a liquid crystal display device with high transmittance or viewing angle characteristics. A liquid crystal display device of the present invention includes: a first substrate (10) which includes a pixel electrode (30); a second substrate (20) which includes a counter electrode (25); and a liquid crystal layer (21) and a spacer (40) which are provided between the first substrate (10) and the second substrate (20). The pixel electrode (30) includes a first portion which is formed by a plurality of first branch portions (34A) extending in a first direction, a second portion which is formed by a plurality of second branch portions (34B) extending in a second direction, a third portion which is formed by a plurality of third branch portions (34C) extending in a third direction, and a fourth portion which is formed by a plurality of fourth branch portions (34D) extending in a fourth direction. The spacer (40) is provided at a position in the pixel (50) which is surrounded by the first to fourth portions of the pixel electrode (30) when viewed from a direction perpendicular to a plane of the first substrate (10).

14 Claims, 17 Drawing Sheets

(51) Int. Cl.
  *G02F 1/1337* (2006.01)
  *G02F 1/1335* (2006.01)
  *G02F 1/1362* (2006.01)
  *G02F 1/137* (2006.01)

(52) U.S. Cl.
  CPC ..... *G02F1/133512* (2013.01); *G02F 1/133788* (2013.01); *G02F 1/13394* (2013.01); *G02F 1/136213* (2013.01); *G02F 2001/133742* (2013.01); *G02F 2001/13712* (2013.01)

(56) References Cited

U.S. PATENT DOCUMENTS

| | | | |
|---|---|---|---|
| 7,027,116 | B2 | 4/2006 | Ohmuro et al. |
| 7,656,474 | B2 | 2/2010 | Hanaoka et al. |
| 2005/0237459 | A1 | 10/2005 | Ikeda et al. |
| 2007/0285608 | A1 | 12/2007 | Fan et al. |
| 2009/0225260 | A1 | 9/2009 | Adachi et al. |
| 2011/0075087 | A1 | 3/2011 | Morinaga et al. |
| 2012/0154703 | A1 | 6/2012 | Yoshida et al. |

FOREIGN PATENT DOCUMENTS

| | | |
|---|---|---|
| JP | 2003-202594 A | 7/2003 |
| JP | 2005-309239 A | 11/2005 |
| JP | 2006-330638 A | 12/2006 |
| JP | 2007-334345 A | 12/2007 |
| JP | 2009-210752 A | 9/2009 |
| JP | 2009-282409 A | 12/2009 |
| WO | 2009/154031 A1 | 12/2009 |

OTHER PUBLICATIONS

Official Communication issued in International Patent Application No. PCT/JP2011/052020, mailed on Apr. 12, 2011.

LIQUID-CRYSTAL DISPLAY DEVICE

TECHNICAL FIELD

The present invention relates to a liquid crystal display device and particularly to a liquid crystal display device which has a plurality of divisional alignment regions in a pixel.

BACKGROUND ART

As of now, examples of liquid crystal display devices under development which have wide viewing angle characteristics include liquid crystal display devices utilizing the IPS (In-Plane-Switching) mode or the FFS (Fringe Field Switching) mode, which is a transverse electric field mode, and liquid crystal display devices utilizing the VA (Vertical Alignment) mode.

Examples of the VA mode liquid crystal display devices include MVA (Multidomain Vertical Alignment) mode liquid crystal display devices, in which one pixel includes a plurality of domains of different liquid crystal alignment directions, and CPA (Continuous Pinwheel Alignment) mode liquid crystal display devices in which the liquid crystal alignment direction continuously varies around a rivet or the like formed on an electrode at the center of a pixel.

An example of the MVA mode liquid crystal display device is described in Patent Document 1. In the liquid crystal display device of Patent Document 1, the alignment control means which extend in two mutually-orthogonal directions are provided to form four liquid crystal domains in one pixel, in which the azimuthal angles of the directors representing the liquid crystal domains are 45° relative to the polarization axes (transmission axes) of a pair of polarizing plates in a crossed Nicols arrangement. Assuming that the direction of the polarization axis of one of the polarizing plates is azimuthal angle 0° and that the counterclockwise direction is the positive direction, the azimuthal angles of the directors of the four liquid crystal domains are 45°, 135°, 225°, and 315°. Such a structure which includes four domains in one pixel is referred to as "four-domain alignment structure" or simply "4D structure".

Another example of the MVA mode liquid crystal display device is described in Patent Document 2. In the liquid crystal display device described in this patent document, the pixel electrode (also referred to as "comb tooth-like pixel electrode" or "fishbone-like pixel electrode") has a large number of fine slits (narrow cuts) extending in the directions of azimuthal angles 45°, 135°, 225°, and 315°. Liquid crystal is aligned parallel to these slits, whereby the four-domain alignment structure is realized.

A layout example of a gate bus line, a source bus line, and a TFT (Thin Film Transistor) in a liquid crystal display device is described in Patent Document 3.

CITATION LIST

Patent Literature

Patent Document 1: Japanese Laid-Open Patent Publication No. 11-242225
Patent Document 2: Japanese Laid-Open Patent Publication No. 2006-330638
Patent Document 3: Japanese Laid-Open Patent Publication No. 2003-202594

SUMMARY OF INVENTION

Technical Problem

FIG. 19 is a plan view showing an example of a vertical alignment type liquid crystal display device 200 which includes a fishbone-like pixel electrode 210. The pixel electrode 210 has a plurality of slits 220 extending in the 45° direction, the 135° direction, the 225° direction, and the 315° direction, where the left to right direction in the drawing is assigned as the azimuthal angle 0° direction. The pixel electrode 210 includes a trunk electrode 214 and a plurality of branch electrodes 212 extending from the trunk electrode 214 in the 45° direction, the 135° direction, the 225° direction, and the 315° direction. At the centers of respective ones of the two short sides of each pixel of the liquid crystal display device 200, pillar-like spacers 240 are provided for maintaining the space (or "cell gap") between the TFT substrate and the counter substrate that oppose each other via the liquid crystal layer.

When a voltage is applied between the pixel electrode 210 and the common electrode of the liquid crystal display device 200, the liquid crystal 230 in each domain is aligned parallel to the extending direction of the slits 220 such that the upper end of the liquid crystal (an end of the liquid crystal which is closer to the counter substrate) falls toward the inner part of the pixel. Here, due to the presence of the spacers 240, the alignment controlling force operates on the liquid crystal 230 near the spacers 240 in the directions that is perpendicular to the lateral surface of the spacers 240. The direction of this alignment controlling force is different from the directions of the alignment controlling force produced by the slits 220 (in the 45° direction, the 135° direction, the 225° direction, and the 315° direction). Therefore, such a problem may occur that, due to the presence of the spacers 240, the alignment of the liquid crystal is disturbed. Occurrence of a disturbance in the liquid crystal alignment decreases the portion of the liquid crystal which contributes to formation of four domains of the 4D structure, leading to a problem that the transmittance, the contrast, or the viewing angle characteristics deteriorate. Further, for example, if the transmittance varies among the domains or pixels, a defect in display, such as display roughness, will occur.

In the aforementioned patent documents, the above-described problems which may arise in a liquid crystal display device that includes a fishbone-like pixel electrode are not considered. No countermeasures to the problems are suggested.

The present invention was conceived for the purpose of solving the above problems. One of the objects of the present invention is to provide a vertical alignment type liquid crystal display device with excellent transmittance, contrast, and viewing angle characteristics. Another one of the objects of the present invention is to provide a vertical alignment type liquid crystal display device with excellent transmittance, contrast, and viewing angle characteristics, which is realized by providing spacers at appropriate positions in a liquid crystal display device which has a fishbone-like pixel electrode.

Solution to Problem

A liquid crystal display device of the present invention includes: a first substrate which includes a pixel electrode provided in a pixel; a second substrate which includes a counter electrode provided opposite to the pixel electrode; a liquid crystal layer which is provided between the first substrate and the second substrate, the liquid crystal layer including a liquid crystal that has a negative dielectric anisotropy; and a spacer which is provided between the first substrate and the second substrate, wherein the pixel electrode includes a first portion which is formed by a plurality of first branch portions extending in a first direction, a second portion which is formed by a plurality of second branch portions extending in a second direction, a third portion which is formed by a plurality of third branch portions extending in a third direction, and a fourth portion which is formed by a plurality of fourth branch portions extending in a fourth direction, the first direction, the second direction, the third direction, and the fourth direction are different directions from one another, and the spacer is provided at a position in the pixel which is surrounded by the first portion, the second portion, the third portion, and the fourth portion of the pixel electrode when viewed from a direction perpendicular to a plane of the first substrate.

In one embodiment, when a voltage is applied between the pixel electrode and the counter electrode, a first region in which the liquid crystal is aligned along the first branch portions, a second region in which the liquid crystal is aligned along the second branch portions, a third region in which the liquid crystal is aligned along the third branch portions, and a fourth region in which the liquid crystal is aligned along the fourth branch portions are formed by the plurality of first branch portions, the plurality of second branch portions, the plurality of third branch portions, and the plurality of fourth branch portions.

In one embodiment, the first substrate includes a TFT which is provided in the pixel, and the spacer is provided at a position so as to overlap the TFT when viewed from a direction perpendicular to a plane of the first substrate.

In one embodiment, the second substrate includes a light blocking film which is provided at a position so as to overlap the spacer and the TFT when viewed from a direction perpendicular to a plane of the first substrate.

In one embodiment, the first substrate includes a signal line for supplying a display signal to the pixel electrode, the pixel electrode includes a first trunk portion extending in a fifth direction that is different from either of the first to fourth directions, the plurality of first branch portions, the plurality of second branch portions, the plurality of third branch portions, or the plurality of fourth branch portions are branching off from the first trunk portion, and the signal line is provided at a position so as to overlap the first trunk portion when viewed from a direction perpendicular to a plane of the first substrate.

In one embodiment, the first substrate includes a scan line for supplying a gate signal to the TFT, the pixel electrode includes a second trunk portion extending in a sixth direction that is different from either of the first to fifth directions, the plurality of first branch portions, the plurality of second branch portions, the plurality of third branch portions, or the plurality of fourth branch portions are branching off from the second trunk portion, and the scan line is provided at a position so as to overlap the second trunk portion when viewed from a direction perpendicular to a plane of the first substrate.

In one embodiment, the spacer is provided at a position so as to overlap a portion where the first trunk portion and the second trunk portion intersect with each other or a portion where an extension line of the first trunk portion and an extension line of the second trunk portion intersect with each other when viewed from a direction perpendicular to a plane of the first substrate.

In one embodiment, the first substrate includes an insulating layer, the pixel electrode and a drain electrode of the TFT are electrically coupled to each other via a contact hole which is formed in the insulating layer, and the contact hole is provided at a position so as not to overlap the light blocking film when viewed from a direction perpendicular to a plane of the first substrate.

In one embodiment, the pixel has a rectangular shape when viewed from a direction perpendicular to a plane of the first substrate, and the contact hole is provided at the center of a short side of the pixel.

In one embodiment, the first substrate includes a storage capacitor line which is provided in a peripheral region of the pixel and a storage capacitor counter electrode which is electrically coupled to a drain electrode of the TFT, and the storage capacitor line and the storage capacitor counter electrode overlap each other when viewed from a direction perpendicular to a plane of the first substrate.

In one embodiment, the pixel electrode includes an island electrode which is provided so as to cover the TFT.

In one embodiment, the first substrate includes an insulating layer, the pixel electrode and a drain electrode of the TFT are electrically coupled via a contact hole formed in the insulating layer, and the contact hole is provided at a position so as to overlap the light blocking film when viewed from a direction perpendicular to a plane of the first substrate.

In one embodiment, the island electrode is provided so as to cover the contact hole.

In one embodiment, the first substrate includes a storage capacitor line which is provided in a peripheral region of the pixel, and part of the storage capacitor line and part of the first portion, the second portion, the third portion, and the fourth portion of the pixel electrode overlap each other when viewed from a direction perpendicular to a plane of the first substrate.

In one embodiment, the first substrate does not include a storage capacitor line, and a storage capacitor electrode is provided on a side of the pixel electrode which is opposite to the liquid crystal layer.

In one embodiment, the storage capacitor electrode has an opening, and the contact hole is provided inside the opening when viewed from a direction perpendicular to a plane of the first substrate.

Advantageous Effects of Invention

According to the present invention, a liquid crystal display device with excellent transmittance or viewing angle characteristics can be provided.

DESCRIPTION OF EMBODIMENTS

Hereinafter, a vertical alignment type liquid crystal display device 100 according to an embodiment of the present invention is described with reference to the drawings. Note that, however, the present invention is not limited to the embodiment described below.

Figure 1:
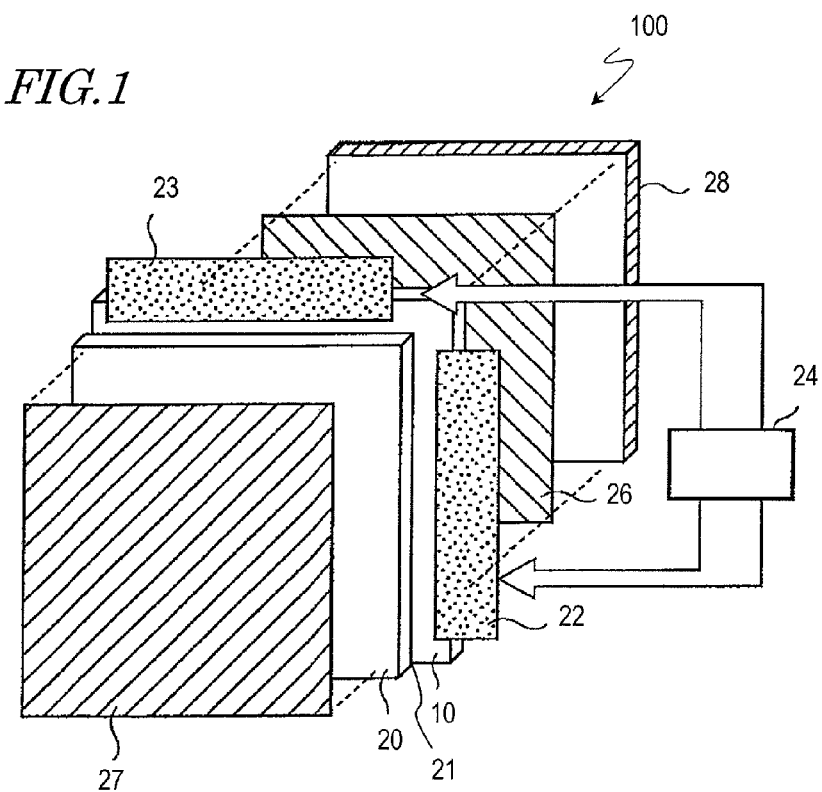
FIG. 1 A perspective view schematically showing a configuration of a liquid crystal display device 100 of the present invention.
Figure 2:
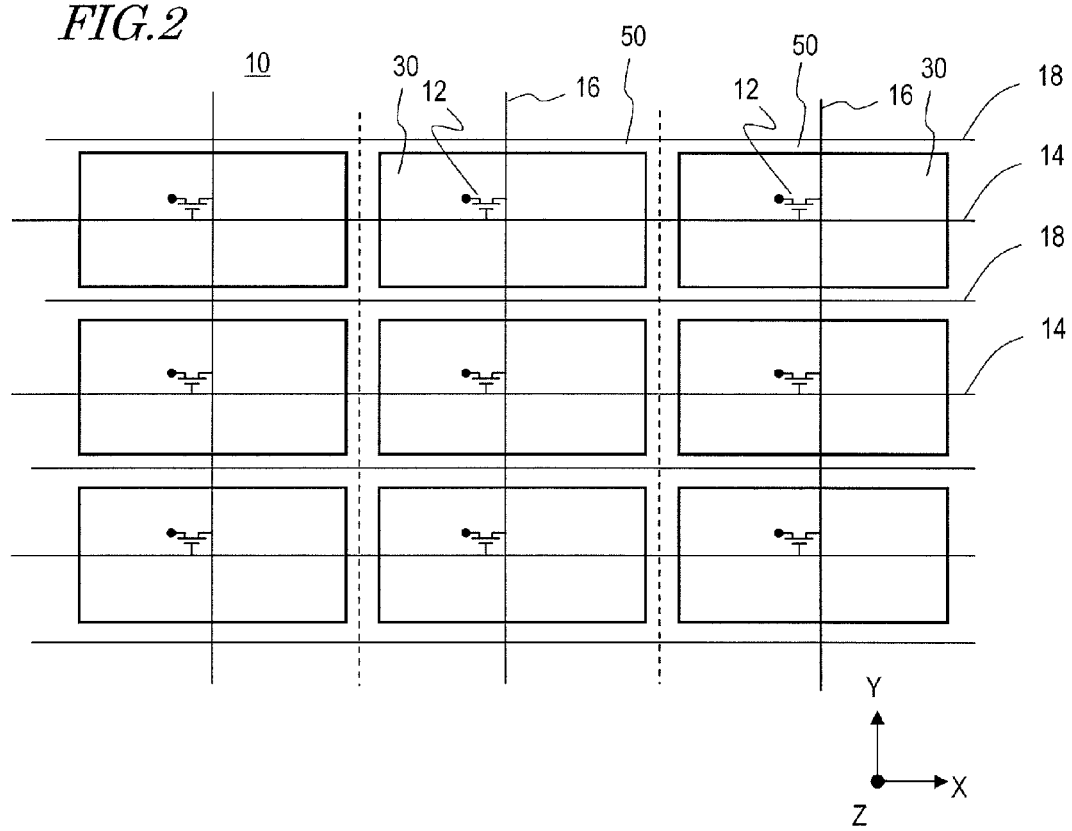
FIG. 2 A plan view schematically showing a configuration of a plurality of pixels 50 in the liquid crystal display device 100.

FIG. 1 is a perspective view schematically showing the configuration of the liquid crystal display device 100. FIG. 2 is a plan view schematically showing the configuration of a plurality of pixels 50 of the liquid crystal display device 100.

As shown in FIG. 1, the liquid crystal display device 100 includes a TFT substrate 10 and a counter substrate (CF substrate) 20 which oppose each other with a liquid crystal layer 21 interposed therebetween, polarizers 26 and 27 which are provided on the outer side of respective one of the TFT substrate (first substrate) 10 and the counter substrate (second substrate) 20, and a backlight unit 28 for emitting display light toward the polarizer 26.

The liquid crystal display device 100 is a vertical alignment type liquid crystal display device which performs display in a normally-black mode using the pixels 50 which are in a matrix arrangement along the X direction (the horizontal direction in the drawing) and the Y direction (the vertical direction in the drawing) as shown in FIG. 2. The pixel 50 corresponds to a display region of any one color of R, G, and B in the minimum unit of display consisting of three primary colors, red (R), green (G), and blue (B). Note that the minimum unit of display may consist of four or more primary colors (multi-primary color display). In that case, the pixel 50 corresponds to a display region of any one of a plurality of primary colors that form the minimum unit of display. The width in the X direction and the width in the Y direction of the pixel 50 are, for example, 300 μm and 100 μm, respectively.

In the TFT substrate 10, a plurality of scan lines (gate bus lines) 14 extending in the X direction and a plurality of signal lines (data bus lines) 16 extending in the Y direction are arranged so as to cross one another at right angles. Near each of the intersections of the plurality of scan lines 14 and the plurality of signal lines 16, a TFT 12, which is an active element, is provided for each of the pixels 50. In each of the pixels 50, a pixel electrode 30 is provided which is electrically coupled to a drain electrode of the TFT 12 and which is made of, for example, ITO (Indium Tin Oxide) or IZO (Indium Zinc Oxide). Between two adjacent pixel electrodes 30, a storage capacitor line (also referred to as "storage capacitor bus line" or "Cs line") 18 is extending in the X direction. The thickness of the pixel electrode 30 is, for example, 0.1 μm.

The plurality of scan lines 14 and the plurality of signal lines 16 are respectively coupled to a scan line driving circuit 22 and a signal line driving circuit 23 which are shown in FIG. 1. The scan line driving circuit 22 and the signal line driving circuit 23 are coupled to a control circuit 24. According to the control by the control circuit 24, scan signals for switching the ON-OFF state of the TFTs 12 are supplied from the scan line driving circuit 22 to the scan lines 14. Also, according to the control by the control circuit 24, display signals (applied voltage to the pixel electrode 30) are supplied from the signal line driving circuit 23 to the plurality of signal lines 16.

The counter substrate 20 includes a color filter 13, a common electrode (counter electrode) 25, and a black matrix (BM) 54 as will be described later in FIG. 4. In the case of three primary color display, the color filter 13 includes a R (red) filter, a G (green) filter, and a B (blue) filter, each of which is arranged so as to correspond to a pixel. The common electrode 25 is formed so as to extend over the plurality of pixel electrodes 30. Liquid crystal molecules lying between these electrodes are aligned in every pixel according to the potential difference caused between the common electrode 25 and each of the pixel electrodes 30, whereby display is performed.

Embodiment 1

Figure 3:
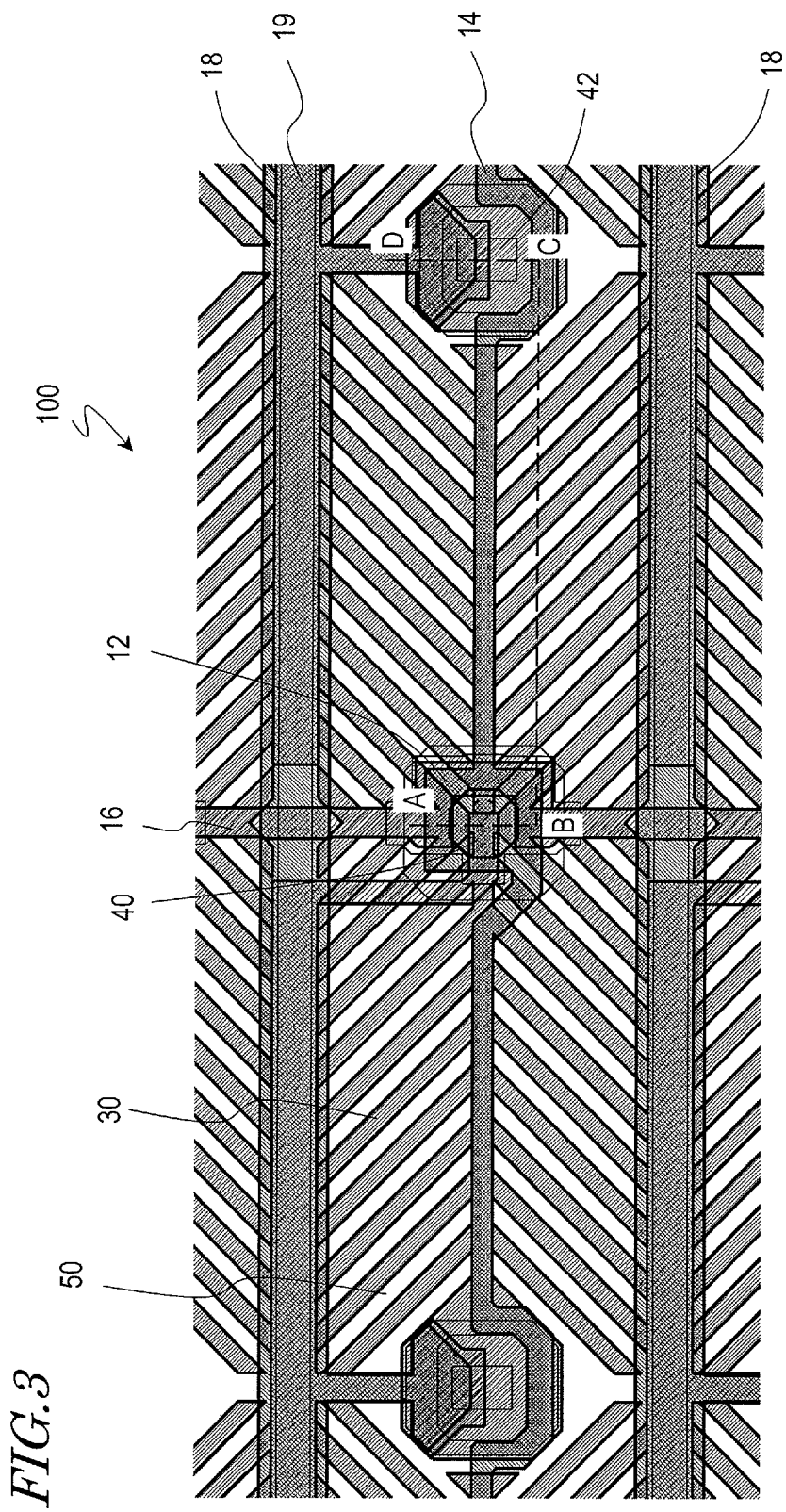
FIG. 3 A plan view showing a configuration of a pixel 50 of the liquid crystal display device 100 of Embodiment 1 of the present invention.
Figure 6:
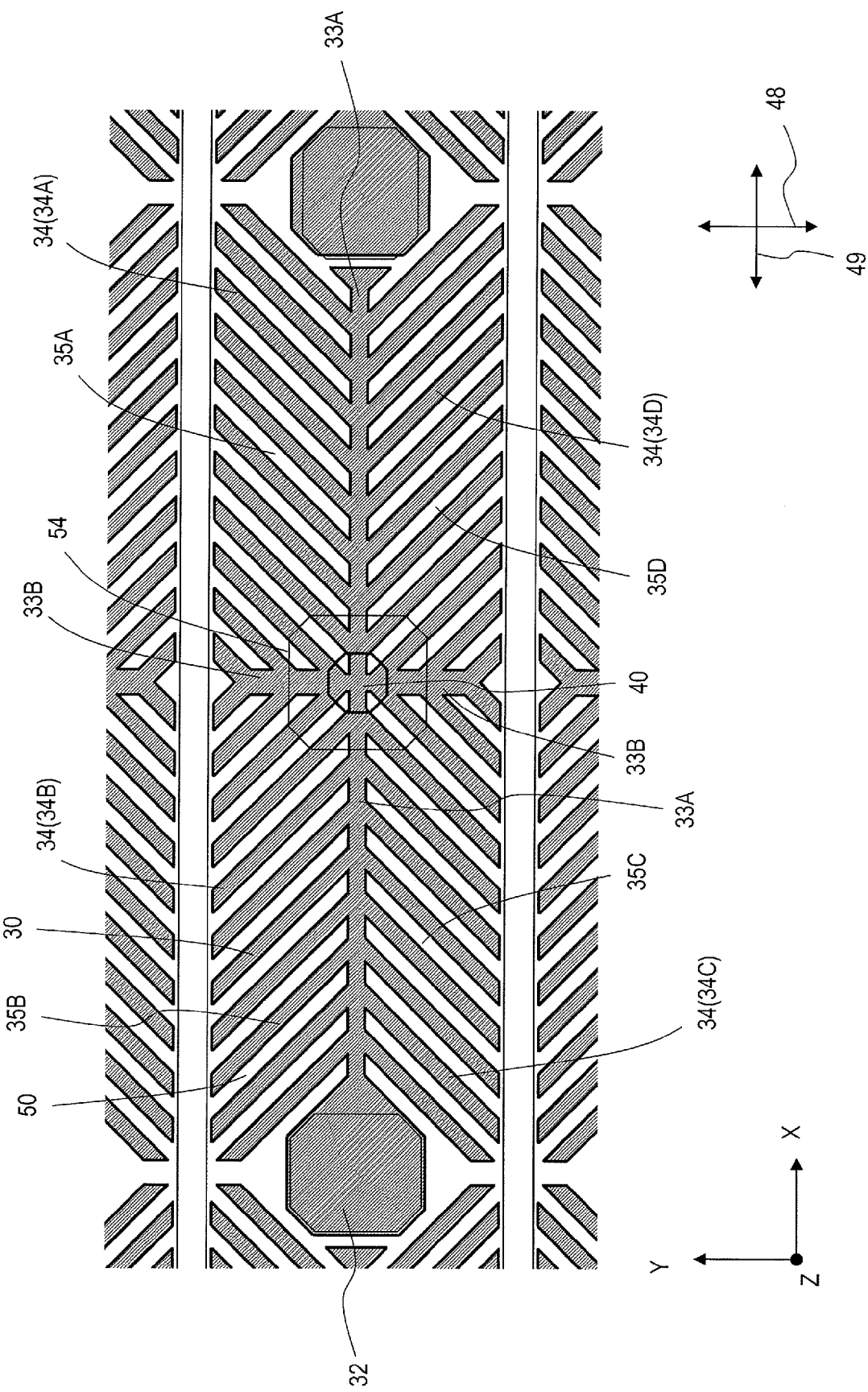
FIG. 6 A plan view showing the shape of a pixel electrode 30 of the liquid crystal display device 100.
Figure 7:
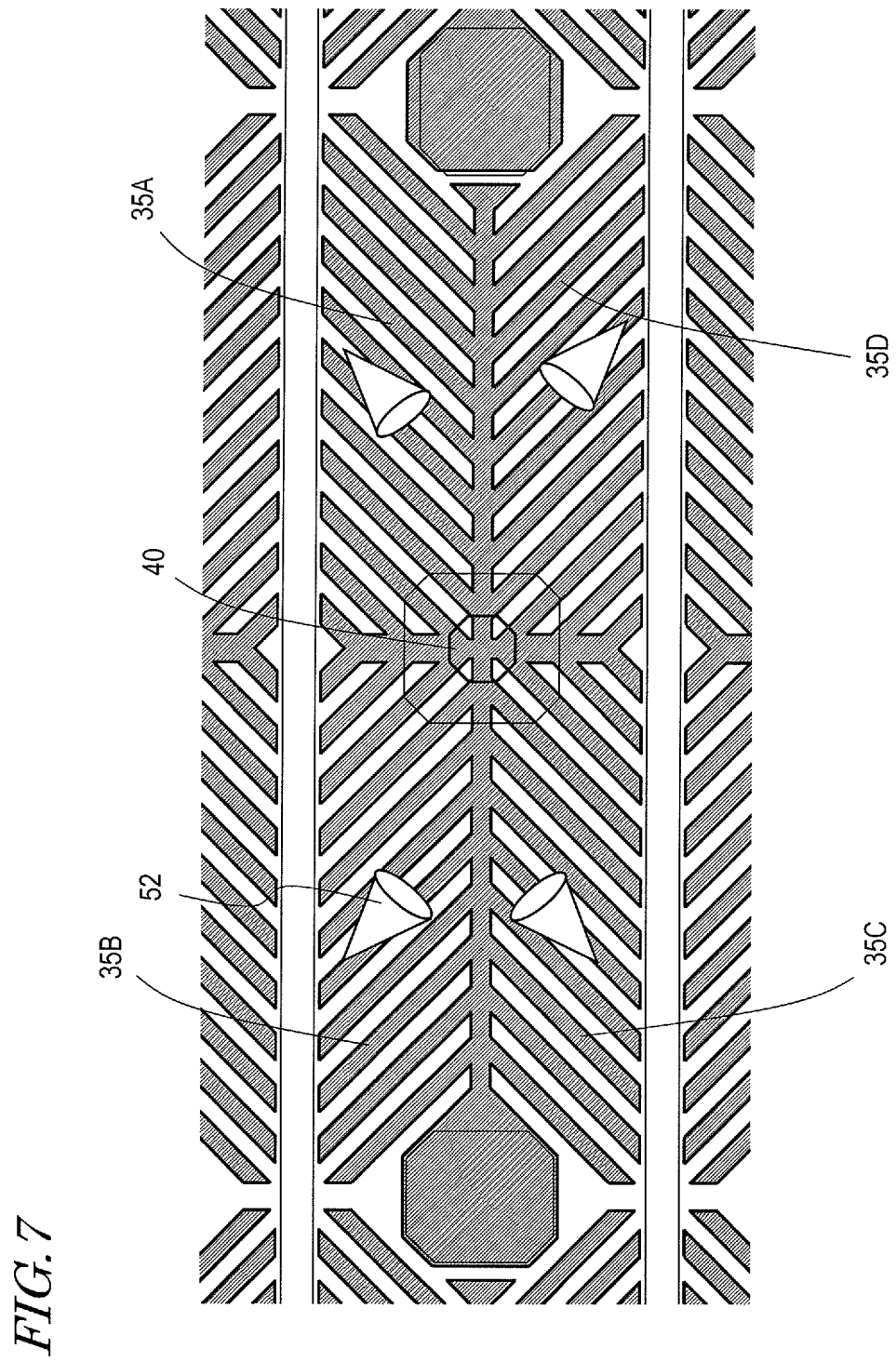
FIG. 7 A plan view showing the shape of the pixel electrode 30 and the alignment of the liquid crystal 52.

FIG. 3 is a plan view showing a configuration of a pixel 50 of the liquid crystal display device 100 of Embodiment 1 of the present invention. FIG. 4 is a cross-sectional view showing the configuration of the pixel 50 taken along line A-D of FIG. 3. FIG. 5 is a plan view showing the wiring configuration in the pixel 50 lying under the pixel electrode 30 of the TFT substrate 10. FIG. 6 is a plan view schematically showing the shape of the pixel electrode 30. FIG. 7 is a plan view schematically showing the shape of the pixel electrode 30 and the alignment of the liquid crystal 52. Note that FIG. 6 and FIG. 7 show not only the location of the pixel electrode 30 but also the location of a spacer 40 and a black matrix 54.

Figure 4:
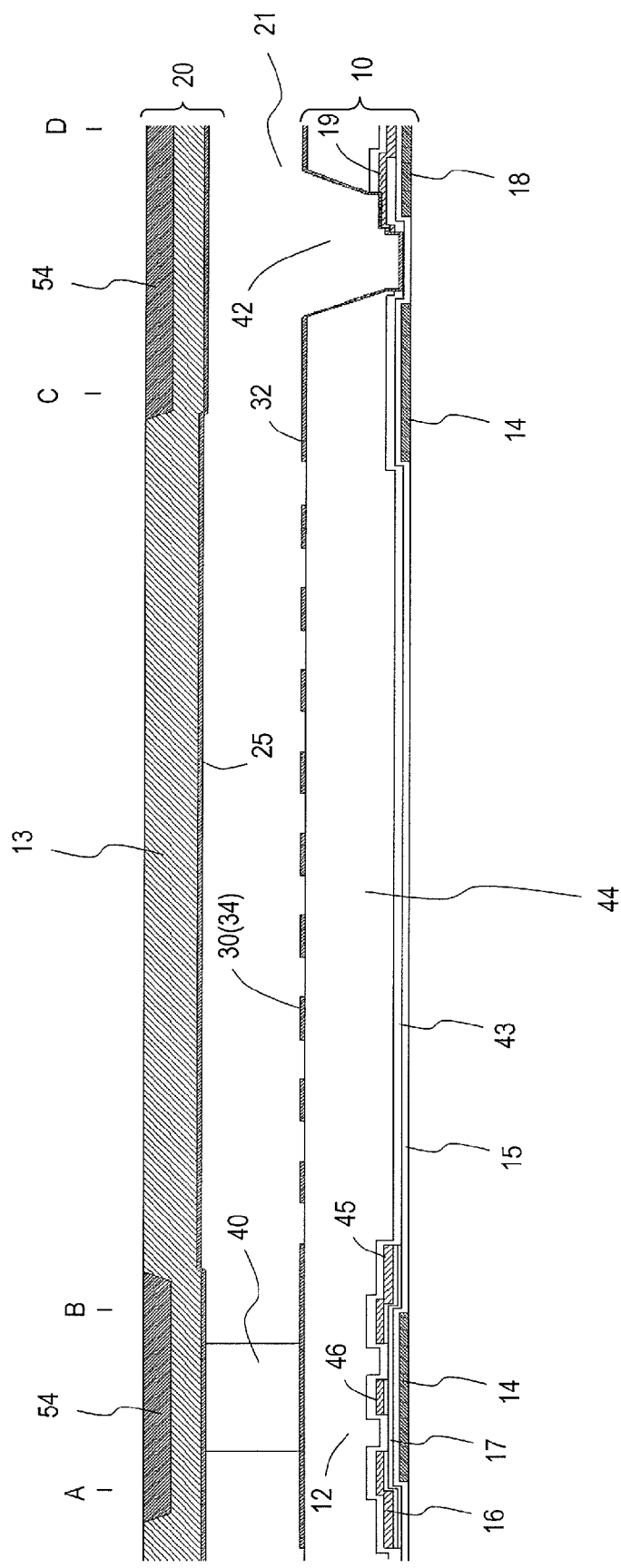
FIG. 4 A cross-sectional view showing the configuration of the pixel 50 taken along line A-D of FIG. 3.
Figure 5:
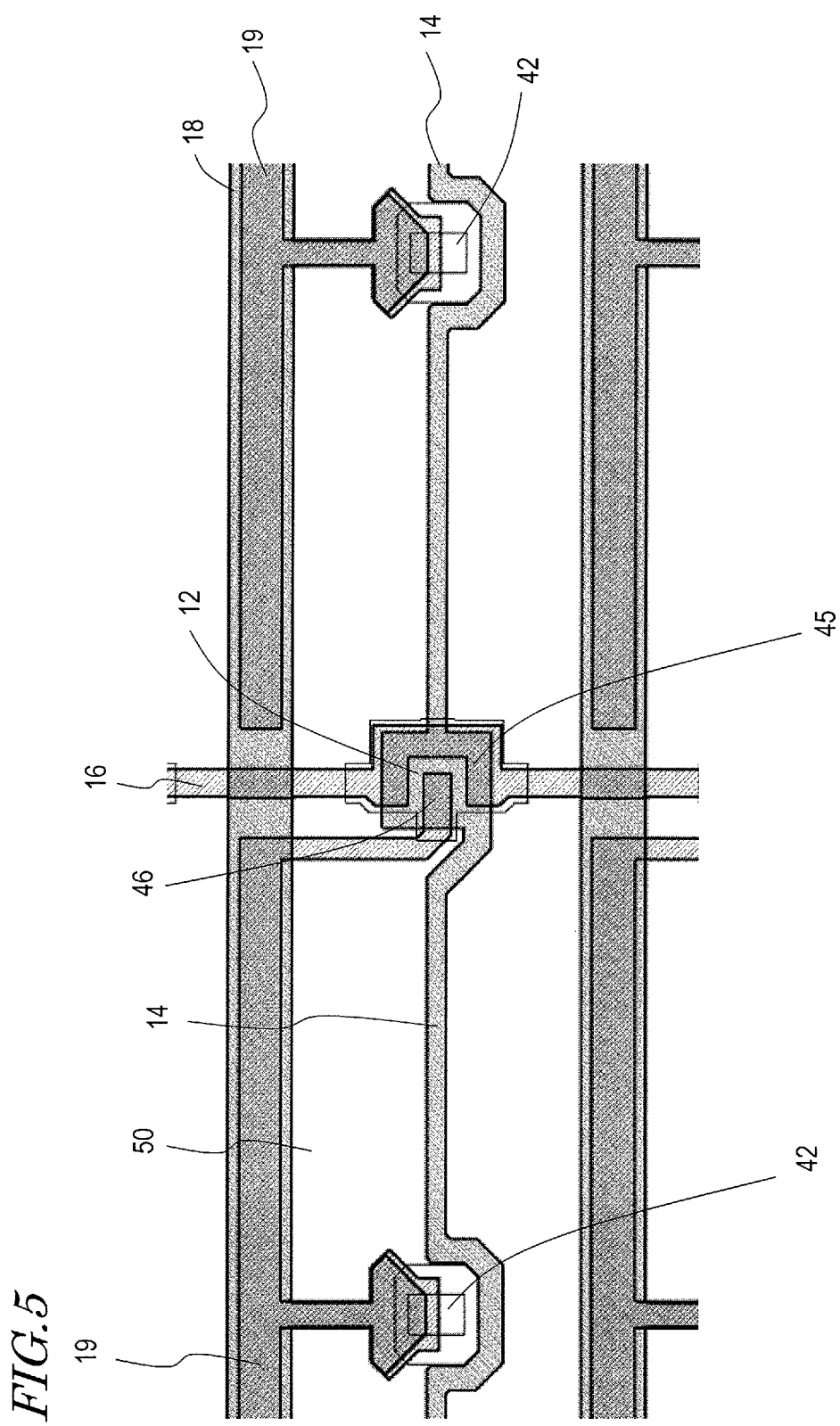
FIG. 5 A plan view showing the wiring configuration in the pixel 50.

As shown in FIGS. 3 to 5, the TFT substrate 10 includes a scan line 14 formed on a transparent substrate, a storage capacitor line 18, a TFT 12, a signal line 16, a storage capacitor counter electrode 19, and a fishbone-like pixel electrode 30. On the scan line 14 and the storage capacitor line 18, a gate insulating film 15 is provided. The TFT 12 is provided over the scan line 14 such that the gate insulating film 15 is interposed therebetween. Also, the storage capacitor counter electrode 19 is provided over the storage capacitor line 18 such that the gate insulating film 15 is interposed therebetween. The scan line 14, the storage capacitor line 18, the signal line 16, and the storage capacitor counter electrode 19 may be a layer which is made of a single element, such as Al (aluminum), Ti (titanium), TiN (titanium nitride), Mo (molybdenum) or the like, or an alloy of these metals, or a multilayer structure formed by a plurality of stacked layers of these metals. The scan line 14 and the storage capacitor line 18 may be made of the same material in the same layer. The signal line 16 and the storage capacitor counter electrode 19 may be made of the same material in the same layer. The gate insulating film 15 is made of, for example, a silicon nitride (SiNx) so as to have a thickness of about 0.4 μm.

The TFT 12 includes a semiconductor layer 17 formed on the gate insulating film 15. A source electrode 45 and a drain electrode 46 of the TFT are electrically coupled to the signal line 16 and the storage capacitor counter electrode 19, respectively, as shown in FIG. 3 and FIG. 5. Part of the storage capacitor line 18 and the storage capacitor counter electrode 19, which oppose each other with the gate insulating film 15 interposed therebetween, form a storage capacitor. The TFT 12, the signal line 16, and the storage capacitor counter electrode 19 are covered with a protective insulating film 43, and an interlayer insulating film 44 is provided on the protective insulating film 43, as shown in FIG. 4. One or both of the protective insulating film 43 and the interlayer insulating film 44 is sometimes referred to as "insulating layer(s)".

The protective insulating film 43 and the interlayer insulating film 44 extending over the storage capacitor counter electrode 19 have a contact hole 42. The drain electrode 46 of the TFT 12 and the pixel electrode 30 are electrically coupled to each other via the contact hole 42. Thus, part of the pixel electrode 30 extending over the inner surface of the contact hole 42 is coupled to the electrode extending from the storage capacitor counter electrode 19 or the storage capacitor counter electrode 19 at the bottom of the contact hole 42, whereby the pixel electrode 30 and the drain electrode 46 are electrically coupled to each other.

The counter substrate 20 includes a common electrode 25, a color filter 13, and a black matrix 54 as shown in FIG. 4. Between the TFT substrate 10 and the counter substrate 20, a liquid crystal layer 21 is provided which includes a nematic liquid crystal that has a negative dielectric anisotropy ($\Delta\epsilon<0$). The thickness of the liquid crystal layer 21 is 3.1 μm. This thickness is preferably not less than 2.0 μm and not more than 5 μm. The liquid crystal layer 21 may include a chiral agent. Note that, although not shown, alignment films (vertical alignment films) are provided on the interlayer insulating film 44 and the pixel electrode 30 of the TFT substrate 10 (the liquid crystal layer 21 side) and on the common electrode (the liquid crystal layer 21 side). Due to the function of the alignment films, the liquid crystal of the liquid crystal layer 21 is aligned vertical to the substrate plane of the TFT substrate 10 or the counter substrate 20 in the absence of an applied voltage.

On the alignment film of each of the TFT substrate 10 and the counter substrate 20, an alignment sustaining layer may be provided which causes the liquid crystal in the absence of an applied voltage to have a pretilt. The alignment sustaining layers are polymer layers which are formed by photopolymerizing a photopolymerizable monomer contained in a liquid crystal material in the presence of an applied voltage across the liquid crystal layer after formation of a liquid crystal cell. Due to the alignment sustaining layers, even in the absence of an applied voltage, the liquid crystal can sustain (memorize) a pretilt which is caused in a direction slightly inclined (by about 2-3°) from the direction that is vertical to the substrate plane and an orientation azimuth (pretilt azimuth). This technique is called a Polymer Sustained Alignment (PSA) technique. By using this technique, the response speed of the liquid crystal orientation at the time of voltage application can be improved.

Between the TFT substrate 10 and the counter substrate 20, a pillar-like spacer 40 is provided for maintaining the thickness of the liquid crystal layer 21 at a predetermined value or within a predetermined range. In the present embodiment, the spacer is provided at the center of the pixel 50 that has a generally-perpendicular perimeter shape.

Next, the pixel electrode 30 and the spacer 40 are described in more detail with reference to FIG. 6. Note that, throughout the descriptions of the embodiments of the present invention, the extending direction of the scan lines 14 (the horizontal direction in the drawing) is referred to as "X direction", the extending direction of the signal lines 16 (the vertical direction in the drawing) is referred to as "Y direction", and a direction which is perpendicular to the substrate plane of the liquid crystal display device 100 is referred to as "Z direction". The positive X direction (the left-to-right direction in the drawing) is identical with the azimuthal angle 0°, relative to which the azimuthal angles are assigned counterclockwise. The positive Y direction (the top-to-bottom direction in the drawing) is identical with the azimuthal angle 90°.

The pixel electrode 30 includes a plurality of branch electrodes 34, a trunk electrode 33A (second trunk portion) and a trunk electrode 33B (first trunk portion), and an island electrode 32. The plurality of branch electrodes 34 includes a plurality of first branch portions 34A extending from the trunk electrode 33A or 33B in the 45° direction (first direction), a plurality of second branch portions 34B extending from the trunk electrode 33A or 33B in the 135° direction (second direction), a plurality of third branch portions 34C extending from the trunk electrode 33A or 33B in the 225° direction (third direction), and a plurality of fourth branch portions 34D extending from the trunk electrode 33A or 33B in the 315° direction (fourth direction). The trunk electrode 33A extends in the X direction (fifth direction). The trunk electrode 33B extends in the Y direction (sixth direction). The island electrode 32 is coupled to a left-side end of the trunk electrode 33A.

The regions formed by the plurality of first branch portions 34A, the plurality of second branch portions 34B, the plurality of third branch portions 34C, and the plurality of fourth branch portions 34D are respectively referred to as the first portion, the second portion, the third portion, and the fourth portion of the pixel electrode 30. When viewed from the Z direction, the spacer 40 is provided at a position where the trunk electrode 33A and the trunk electrode 33B intersect with each other (or provided at a position so as to overlap a portion where an extension line of the first trunk portion and an extension line of the second trunk portion intersect with each other), i.e., a position surrounded by the first portion, the second portion, the third portion, and the fourth portion. The scan line 14 is positioned such that the linear portion of the scan line 14 overlaps the first trunk portion 33A. The signal line 16 is positioned such that the linear portion of the signal line 16 overlaps the second trunk portion 33B.

Ends of the plurality of branch electrodes 34 which are opposite to the trunk electrodes 33A and 33B are not coupled to the other pixel electrode portions but are open ends. The plurality of branch electrodes 34 all have equal widths, and each of the branch electrodes 34 has a uniform width along its length. The width of each branch portion 34 is 3.5 μm. This width is preferably within the range of not less than 1.0 μm and not more than 5.0 μm. The upper part of the trunk electrodes 33A and 33B serves as the boundary of alignment division in the presence of an applied voltage, and the alignment controlling force in this part is small. Therefore, if the width of the trunk electrodes 33A and 33B is large (6 μm or more), defects such as decrease of the luminance and occurrence of display roughness can occur. In view of such, the width of the trunk electrodes 33A and 33B is within the range of not less than 1.0 μm and not more than 5.0 μm (e.g., 3.5 μm).

In each of the first to fourth branch portions 34A to 34D, there is a branch-like slit (a portion where the electrode material is not present) between two adjacent branch portions. The slit extends along the adjacent first branch portions 34A, second branch portions 34B, third branch portions 34C, or fourth branch portions 34D. The width of the slit is 3 μm. This width is preferably within the range of not less than 1.0 μm and not more than 5.0 μm.

When a voltage is applied across the liquid crystal layer 21 by the pixel electrode 30 and the common electrode 25, four liquid crystal alignment domains ("alignment domains", or simply referred to as "regions") 35A, 35B, 35C, and 35D are formed by the first branch portions 34A, the second branch portions 34B, the third branch portions 34C, and the fourth branch portions 34D as shown in FIG. 7. The liquid crystal 52 of the liquid crystal layer 21 is aligned along the first branch portions 34A in the domain 35A, along the second branch portions 34B in the domain 35B, along the third branch portions 34C in the domain 35C, and along the fourth branch portions 34D in the domain 35D. Note that, however, the directions toward which the liquid crystal falls in the presence of an applied voltage in the domains 35A, 35B, 35C, and 35D are opposite to the above-described first direction, the second direction, the third direction, and the fourth direction, respectively. The upper part of the liquid crystal 52 (the end of the liquid crystal which is closer to the counter substrate 20) falls toward the center of the pixel electrode 30 (or the spacer 40).

As shown in FIG. 6, the absorption axes 48 and 49 of the polarizers 26 and 27 extend in the X direction and the Y direction. The directions of the absorption axes 48 and 49 are different from either of the first to fourth directions by 45°. Therefore, the orientation of the liquid crystal in each domain is also different from the directions of the absorption axes 48 and 49 by 45°. This configuration enables display with small viewing-angle dependence.

The spacer 40 is provided at a position so as to overlap the TFT 12 when viewed from the Z direction. The counter substrate 20 includes a black matrix (BM, light blocking film) 54 which is provided at a position so as to overlap the spacer 40 and the TFT 12 when viewed from the Z direction. The contact hole 42 is provided at a position which is at the center of the left short side of the pixel 50 and which is under the island electrode 32, i.e., at a position which does not overlap the black matrix 54.

Although the spacer 40 would be a cause of decrease in transmittance and contrast if provided at an inappropriate position, the spacer 40 of the present embodiment is provided at the intersection of the trunk electrode 33A and the trunk electrode 33B, which is the region that does not contribute to display (or makes a small contribution to display), i.e., a position surrounded by the four domains 35A to 35D (or a position bordering on all of the four domains 35A to 35D), and therefore, the decrease in transmittance and contrast is prevented. Further, commonly, the upper part of the TFT 12 is provided with a light blocking film, such as the black matrix, and therefore this part does not contribute to display. However, in the present embodiment, the spacer 40 is provided at a position so as to overlap the TFT 12 and the black matrix 54 overlying the TFT 12, and therefore, it is not necessary to excessively form the black matrix 54. Thus, display can be realized with higher transmittance.

Also, the scan line 14, the signal line 16, the storage capacitor line 18, and the storage capacitor counter electrode 19 can block light. However, in the present embodiment, the trunk electrodes 33A and 33B extend over the scan line 14 and the signal line 16, and the boundary of the pixels 50 extends over the storage capacitor line 18. Therefore, excellent display can be obtained in which the decrease in luminance due to the metal wirings is small.

The scan line 14 extends under the trunk electrode 33A without extending under the domains 35A to 35D, except for the peripheral part of the TFT 12, so that the decrease in transmittance can be prevented. Further, it is shielded from an electric field produced by the scan line 14, so that impurity ions trapped by the gate potential decrease even when the liquid crystal display device 100 is used for a long period of time. Thus, abnormal display, such as a flicker, can be prevented. Also, when the above-described alignment sustaining layers are formed, an alignment disturbance of the liquid crystal which is caused by the gate potential is small. Thus, a desired pretilt can stably be obtained, and the response speed of the display can be increased.

The signal line 16 extends under the trunk electrode 33B without extending under the domains 35A to 35D, except for the peripheral part of the TFT 12, so that the decrease in transmittance can also be prevented. Further, it is shielded from an electric field produced by the signal line 16, so that an alignment disturbance due to the electric field can be prevented. Also, when the alignment sustaining layers are formed, an alignment disturbance of the liquid crystal which is caused by the source potential is small. Thus, a desired pretilt can stably be obtained.

The storage capacitor line 18 is provided in a region between two adjacent pixel electrodes in which the electrode is not present. The storage capacitor counter electrode 19 is provided so as not to overlap the pixel electrode 30 of an adjacent pixel 50. Thus, the decrease in transmittance which is attributed to the storage capacitor line 18 and the storage capacitor counter electrode 19 can be prevented.

The contact hole 42 is provided under the island electrode 32, and the perimeter of the contact hole 42 is surrounded by the slits of the electrode. Therefore, an alignment disturbance which is attributed to the presence of the contact hole 42 is prevented from spreading to the domains 35A to 35D.

The spacer 40 is provided at a central portion of the pixel 50. When viewed from the Z direction, the spacer 40 has a shape which has four sides perpendicular to (or generally perpendicular to) the respective domains 35A to 35D, such as a tetragonal shape and an octagonal shape. The shape of the spacer 40 may be circular. Since the lateral surface of the spacer 40 is also provided with a vertical alignment film, the spacer 40 itself also provides the alignment controlling force on the liquid crystal 52. The direction of the alignment control (the direction toward which the liquid crystal 52 falls) is identical with a direction which is perpendicular to the lateral surface of the spacer 40.

As shown in FIG. 7, the liquid crystal 52 in the domains 35A to 35D around the spacer 40 is likely to be oriented toward the spacer 40. However, since the lateral surface of the spacer 40 has a plane which is perpendicular to the orientation of the liquid crystal 52, the alignment control direction realized by the spacer 40 and the alignment control direction realized by the domains 35A to 35D are identical (or almost identical) with each other. Therefore, an alignment disturbance is unlikely to occur, and display is obtained with excellent transmittance, contrast, and viewing angle characteristics. Also, the probability of such a defect that the transmittance varies among the domains is reduced, and high quality display can be provided in which occurrence of display roughness is prevented.

Also, when the alignment sustaining layers are employed, an alignment disturbance is unlikely to occur in the process of allowing the alignment sustaining layers to sustain (memorize) the initial liquid crystal alignment by means of voltage application. Therefore, the pretilt in a more appropriate direction can be realized. Thus, in addition to the above-described advantages, the advantage of improved response speed can also be obtained.

Embodiment 2

Next, a liquid crystal display device 101 of Embodiment of the present invention is described with reference to FIG. 8 to FIG. 10. In the following description, the same elements as those of the liquid crystal display device 100 of Embodiment 1 and elements which have the same functions as those of the liquid crystal display device 100 of Embodiment 1 are denoted by the same reference numerals, and the descriptions of those elements and the descriptions of the effects achieved by those elements are omitted, unless stated otherwise. The liquid crystal display device 101 of Embodiment 2 includes the same elements as those of the liquid crystal display device 100 except for elements of which the differences will be illustrated or described below.

Figure 8:
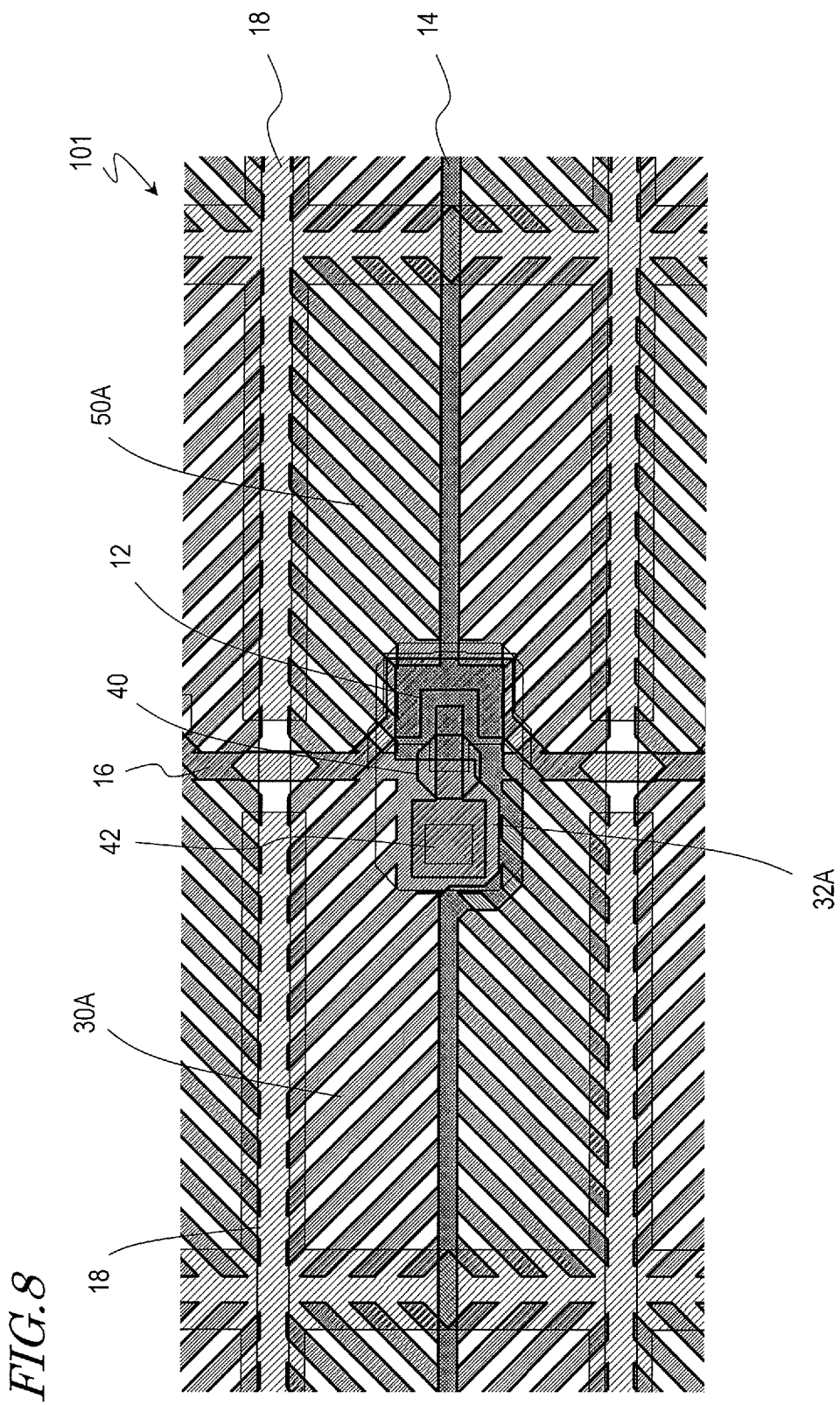
FIG. 8 A plan view showing a configuration of a pixel 50A of a liquid crystal display device 101 of Embodiment 2 of the present invention.

FIG. 8 is a plan view showing a configuration of a pixel 50A of the liquid crystal display device 101. FIG. 9 is a plan view showing the wiring configuration under a pixel electrode 30A in the pixel 50A. FIG. 10 is a plan view schematically showing the shape of the pixel electrode 30A. Note that FIG. 10 shows not only the location of the pixel electrode 30A but also the location of a spacer 40 and a black matrix 54A.

Figure 9:
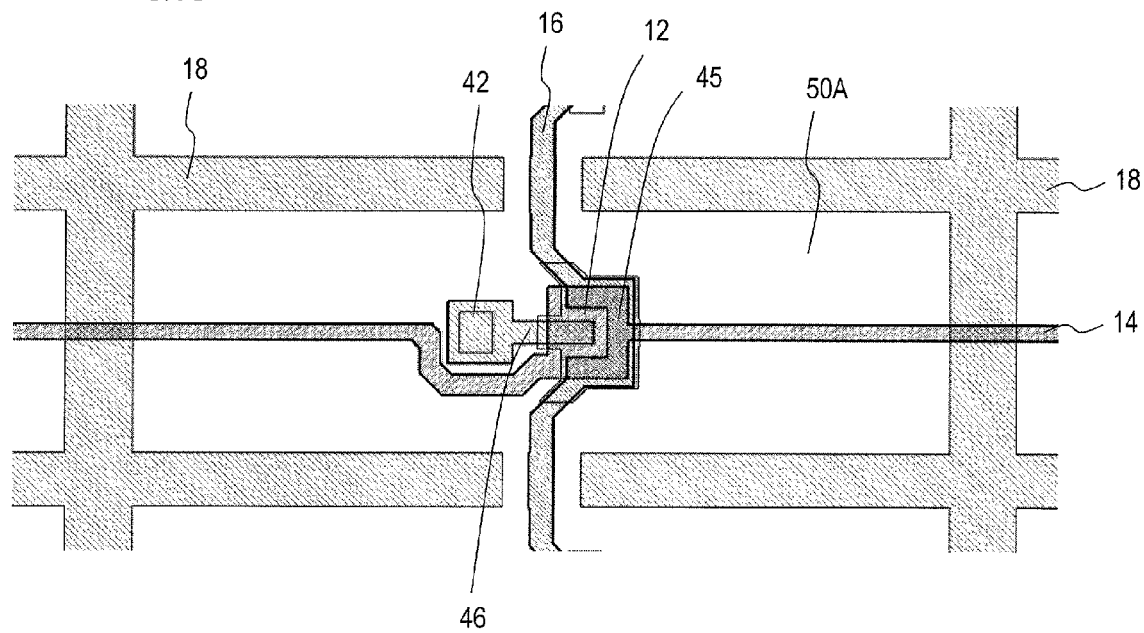
FIG. 9 A plan view showing the wiring configuration in the pixel 50A.
Figure 10:
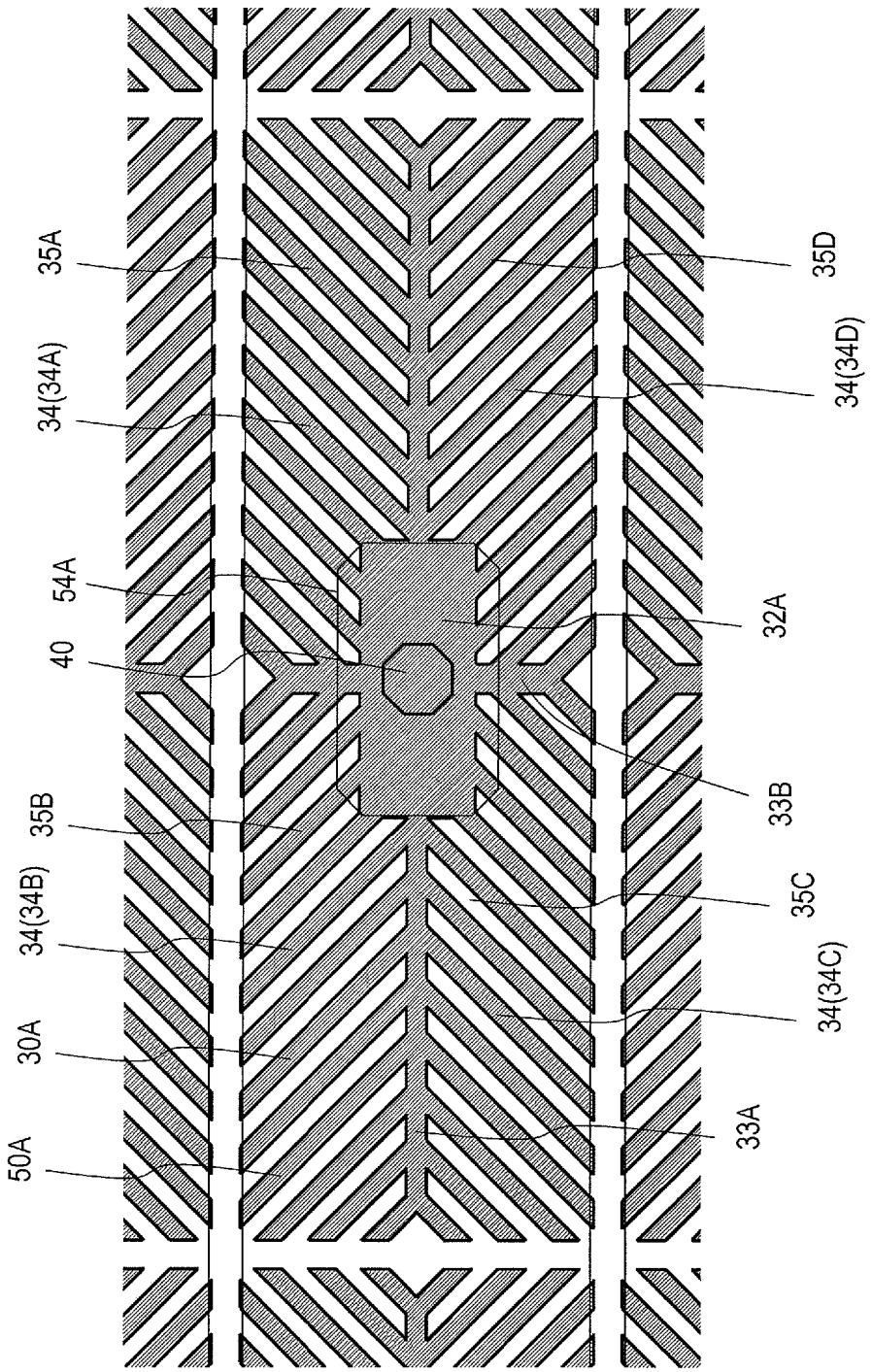
FIG. 10 A plan view showing the shape of the pixel electrode 30A of the liquid crystal display device 101.

As shown in FIG. 8 to FIG. 10, in the liquid crystal display device 101 of Embodiment 2, the location of the TFT 12 and the spacer 40 is the same as that of Embodiment 1 and, however, the pixel electrode 30A includes an island electrode 32A which is provided so as to cover the TFT 12. The contact hole 42 is provided under the island electrode 32A in the vicinity of the TFT 12. The black matrix 54A is provided so as to cover the island electrode 32A, the TFT 12, the spacer 40, and the contact hole 42. In other words, the island electrode 32A is provided so as to overlap the TFT 12, the spacer 40, and the contact hole 42 when viewed from the Z direction. The black matrix 54A is provided so as to overlap the TFT 12, the spacer 40, the contact hole 42, and the island electrode 32A.

Thus, in Embodiment 2, the light blocking layer overlying the contact hole 42 and the light blocking layer overlying the TFT 12 are formed as one black matrix 54A, and the branch electrode 34 is provided in the region where the contact hole 42 is supposed to be provided in Embodiment 1. This configuration enables to reduce the required area of the light blocking layer and increase a region near the perimeter of the pixel 50 in which the branch electrode 34 is to be provided. Therefore, improvements in transmittance and contrast are expected.

The spacer 40 and the contact hole 42 are separated from each other by 5 μm. To prevent the spacer 40 from falling into the contact hole 42, the spacer 40 and the contact hole 42 are preferably separated from each other by 3 μm or more. To enlarge the display region, the distance between these elements is preferably not more than 7 μm.

The storage capacitor line 18 is made of the same material as that of the signal line 16 and is formed in the same layer as the signal line 16, in the peripheral region of the pixel 50. More specifically, the storage capacitor line 18 is provided over the boundaries of adjacent pixels that are side-by-side along the X direction and the Y direction, in a portion that is exclusive of the region in which the signal line 16 is to be formed, so as to extend parallel to the scan line 14 and the signal line 16. When viewed from the Z direction, the peripheral part of the storage capacitor line 18 overlaps the end portions of the first to fourth branch portions 34A to 34D of the pixel electrode 30A. In Embodiment 2, the end portions of the plurality of branch electrodes 34 of the pixel electrode 30A serve as the storage capacitor counter electrode, and the storage capacitor is formed between the end portions of the branch electrodes 34 and the storage capacitor line 18.

In Embodiment 2, the interlayer insulating film 44 may not be provided. To obtain a larger storage capacitance without decreasing the transmittance, only the protective insulating film 43 may be made of a silicon nitride so as to have a thickness of 0.2 μm.

If the storage capacitor counter electrode of one pixel and the pixel electrode of a pixel which is adjacent to the one pixel overlap each other or are neighboring each other, a large parasitic capacitance will be formed. For example, in the case of employing a driving mode in which the polarity of the voltage applied to the pixel electrode is inverted on each of the three scan lines, if this parasitic capacitance is large, a relatively large difference is defectively produced between the liquid crystal application voltage of pixels driven by the outer two out of the three scan lines and the liquid crystal application voltage of a pixel driven by the middle scan line. Particularly, in the case of a liquid crystal display device which is configured such that the color filters of the three primary colors are vertically aligned, if the retained applied voltage varies among the pixels, a grayscale level can defectively appear as having a specific hue. In the liquid crystal display device 101 of Embodiment 2, formation of a parasitic capacitance is prevented in each pixel 50, and therefore, such defects can be reduced. Particularly, in the case where the interlayer insulating film 44 is not formed and only the protective insulating film 43 is formed by a thin film (e.g., about 0.2 μm) of a silicon nitride, formation of a parasitic capacitance between adjacent pixel electrodes 30A is prevented, and therefore, the defects can be more reduced.

Embodiment 3

Next, a liquid crystal display device 102 of Embodiment 3 of the present invention is described with reference to FIG. 11 to FIG. 15. In the following description, the same elements as those of Embodiment 1 and Embodiment 2 and elements which have the same functions as those of Embodiment 1 and Embodiment 2 are denoted by the same reference numerals, and the descriptions of those elements and the descriptions of the effects achieved by those elements are omitted, unless stated otherwise. The liquid crystal display device 102 includes the same elements as those of Embodiment 1 or Embodiment 2 except for elements of which the differences will be illustrated or described below.

Figure 11:
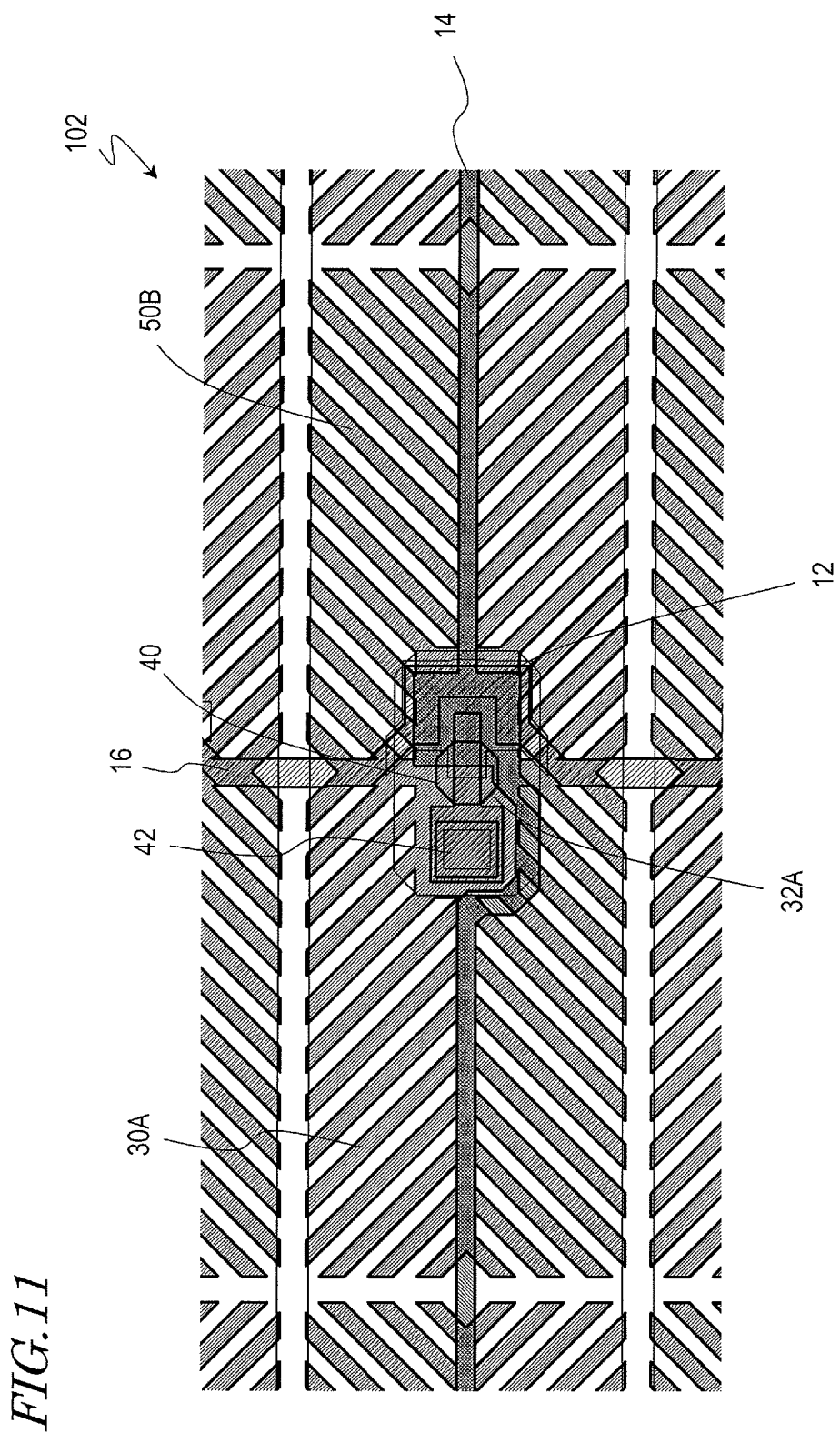
FIG. 11 A plan view showing a configuration of a pixel 50B of a liquid crystal display device 102 of Embodiment 3 of the present invention.
Figure 12:
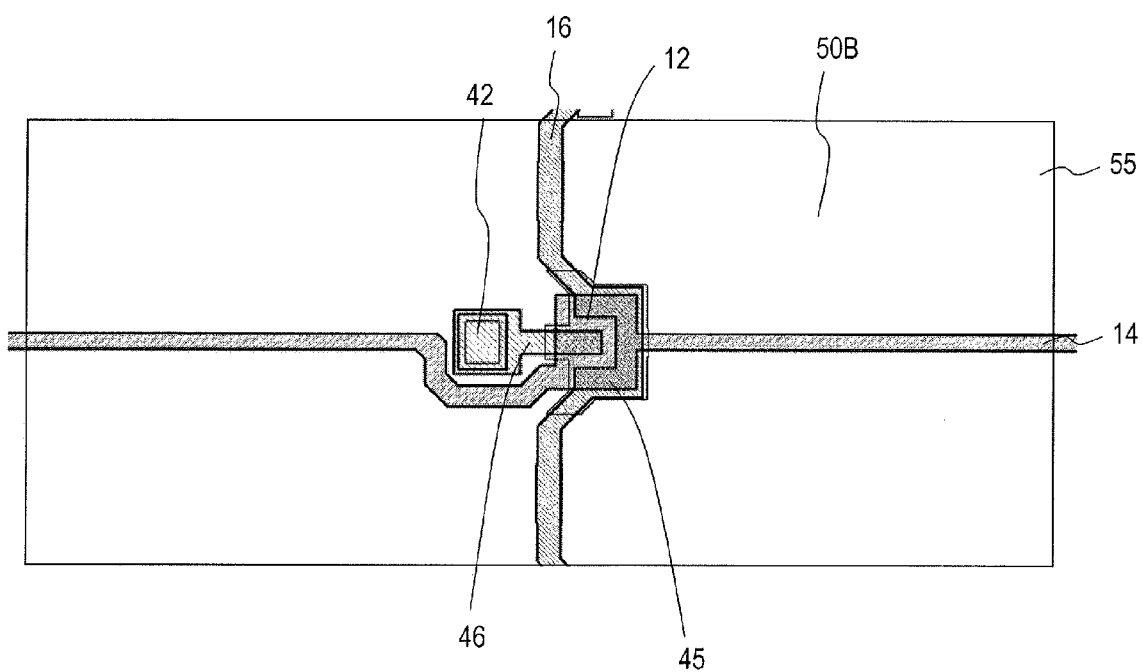
FIG. 12 A plan view showing the wiring configuration in the pixel 50B.
Figure 13:
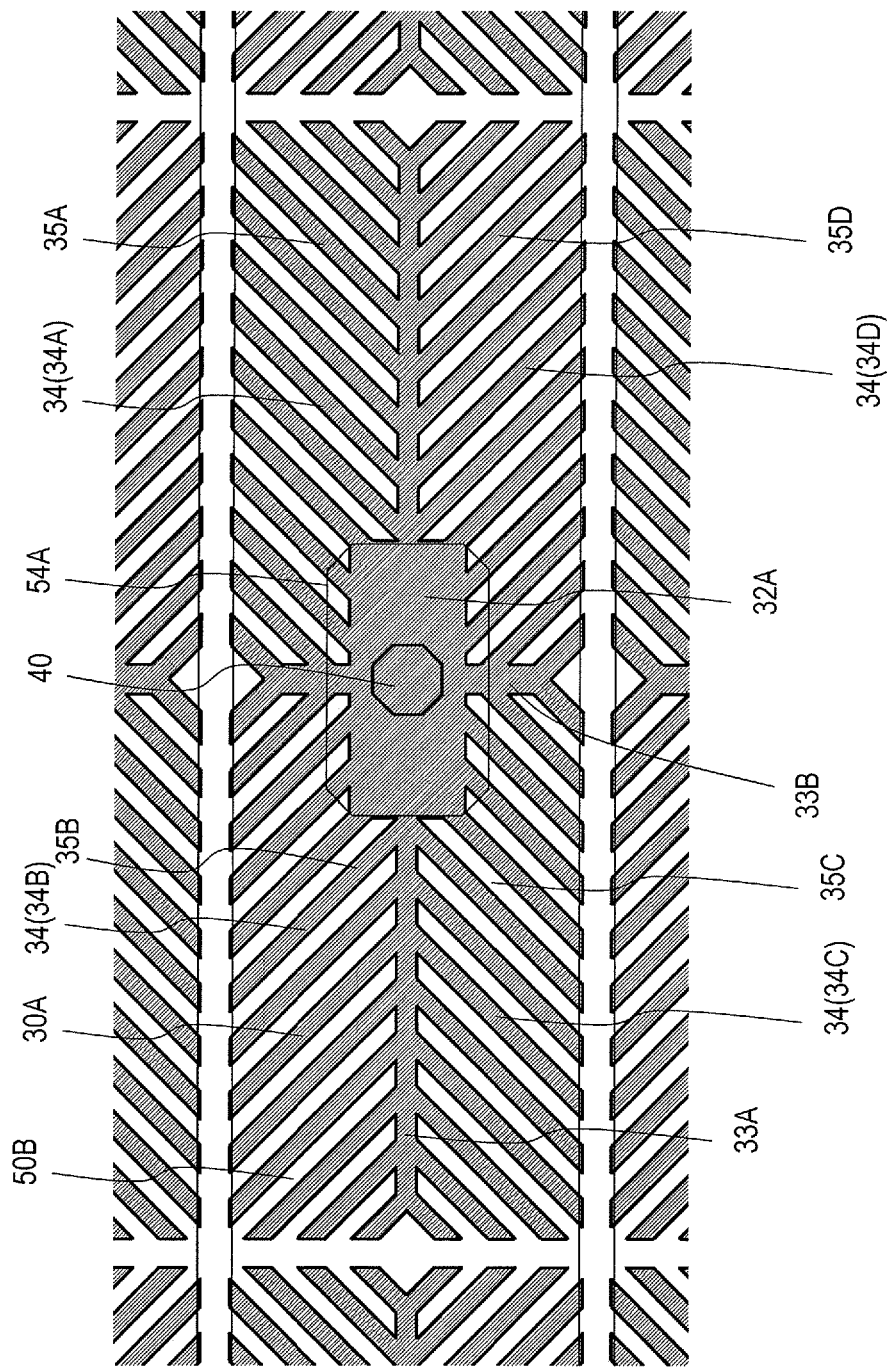
FIG. 13 A plan view showing the shape of the pixel electrode 30A of the liquid crystal display device 102.
Figure 14:
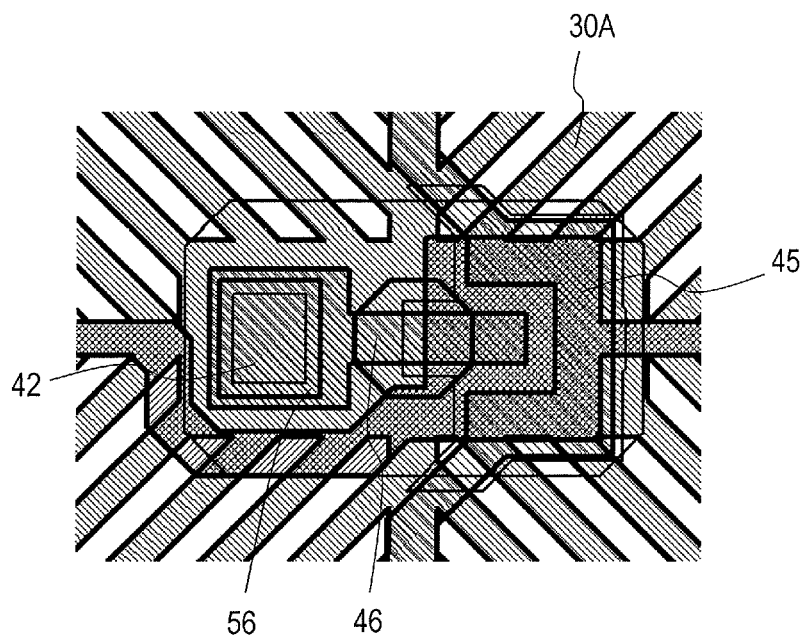
FIG. 14 A plan view showing the wiring configuration in the vicinity of a TFT 12 in the pixel 50B.
Figure 15:
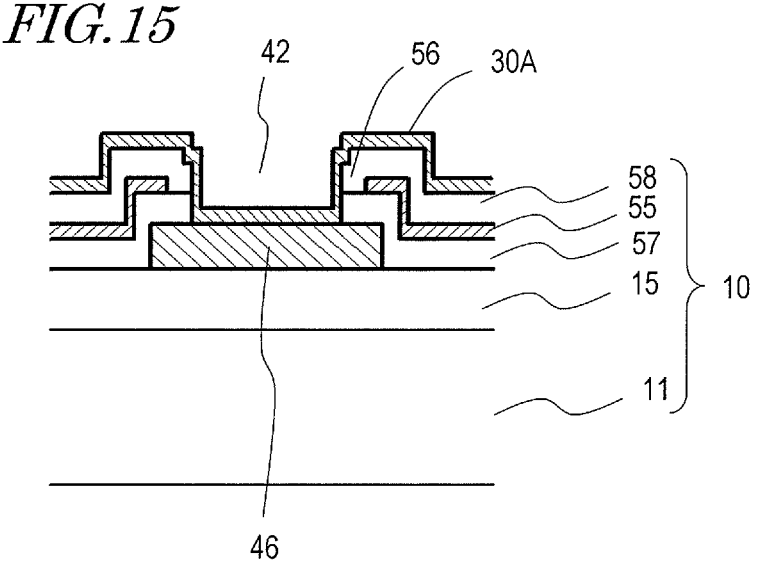
FIG. 15 A cross-sectional view showing the configuration of a TFT substrate 10 in the vicinity of a TFT 12 in the pixel 50B.

FIG. 11 is a plan view showing a configuration of a pixel 50B of the liquid crystal display device 102. FIG. 12 is a plan view showing the wiring configuration lying under the pixel electrode 30A (which has the same shape as the pixel electrode 30A of Embodiment 2) in the pixel 50B. FIG. 13 is a plan view schematically showing the shape of the pixel electrode 30A. FIG. 14 is an enlarged plan view showing the configuration in the vicinity of a TFT 12. FIG. 15 is a cross-sectional view showing the configuration of a TFT substrate 10 in the vicinity of the TFT 12. Note that FIG. 13 shows not only the location of the pixel electrode 30A but also the location of a spacer 40 and a black matrix 54A.

As shown in FIG. 11 to FIG. 15, the liquid crystal display device 102 of Embodiment 3 has the same configuration as that of the liquid crystal display device 101 of Embodiment 2 except that the liquid crystal display device 102 does not include the storage capacitor line 18 and that the liquid crystal display device 102 includes a storage capacitor electrode (transparent electrode) 55 as shown in FIG. 12 and FIG. 15.

The storage capacitor electrode 55 is formed of a transparent electrode material, such as ITO and IZO, so as to extend generally over the entire area of the pixel 50, exclusive of the vicinity of the contact hole 42. The thickness of the storage capacitor electrode 55 is about 0.1 μm. A protection film (insulating film) 57 is provided between the storage capacitor electrode 55 and a substrate 11 and the drain electrode 46. A protection film (insulating film) 58 is provided between the storage capacitor electrode 55 and the pixel electrode 30A. The protection films 57 and 58 are each formed of, for example, SiNx so as to have a thickness of about 0.2 μm.

To make the storage capacitance larger, the protection film 58 is preferably a thin film with a thickness of about 0.2 μm. However, in consideration of the charging capacity of the TFT 12, the thickness of the protection film 58 may be selected so as to prevent the size of the TFT 12 from excessively increasing to such an extent that the aperture ratio can be decreased. Note that, although the protection film 57 employed in this example is formed by a single layer of SiNx or the like, an interlayer insulating film, which is realized by an organic film with a thickness of about 1 to 4 μm and a relative dielectric constant of about 2.0 to 5.0, may be provided over or under the protection film 57 as in Example 1 or Example 2. In this example, the storage capacitor electrode 55 is also provided on the scan line 14 and the signal line 16, and therefore, the load on the scan line 14 and the signal line 16 can be reduced by providing such an interlayer insulating film between the storage capacitor electrode 55 and the scan line 14 or the signal line 16.

At the location of the contact hole 42 and in the vicinity of the contact hole 42, an opening 56 of the storage capacitor electrode 55 is provided as shown in FIG. 15. The contact hole 42 is photolithographically formed inside the opening 56 so as to penetrate the protection films 57 and 58. The contact hole 42 and the opening 56 are preferably formed such that their edges are separated from each other by 1 μm or more, in order to prevent the pixel electrode 30A and the storage capacitor electrode 55 from coming into contact with each other even when misalignment of a photomask or misalignment of the etching position occurs in the photolithography process.

The storage capacitor electrode 55 may be connected to the common electrode 25 outside the display region. Alternatively, the storage capacitor electrode 55 may not be connected to the common electrode 25 and may be supplied with a potential from any other portion. The storage capacitance may be provided between the pixel electrode 30A and the storage capacitor electrode 55.

According to Embodiment 3, no storage capacitor line is included, and therefore, decrease in transmittance which would be caused by any storage capacitor line can be prevented. Further, the storage capacitor electrode 55 serves as a shield against electric fields from the scan line 14 and the signal line 16. Thus, the transmittance and the contrast can be improved.

The storage capacitor line 18 of Embodiment 2 may be added to the elements of Embodiment 3. In this case, a sufficiently large storage capacitance can be obtained even when the width of the storage capacitor line 18 is smaller than that of Embodiment 2, and decrease in transmittance can be prevented. The width of the storage capacitor line 18 employed in Embodiment 3 is, for example, 7 μm. The width of the storage capacitor line of Embodiment 2 is, for example, 12 μm. When the storage capacitor line 18 is provided, light leakage due to an alignment failure at the pixel boundary can be prevented as in Embodiment 2, and therefore, the viewing angle characteristics can be improved.

Embodiment 4

Next, a liquid crystal display device 103 of Embodiment 4 of the present invention is described with reference to FIG. 16 to FIG. 18. In the following description, the same elements as those of Embodiments 1 to 3 and elements which have the same functions as those of Embodiments 1 to 3 are denoted by the same reference numerals, and the descriptions of those elements and the descriptions of the effects achieved by those elements are omitted, unless stated otherwise. The liquid crystal display device 103 includes the same elements as those of Embodiments 1 to 3 except for elements of which the differences will be illustrated or described below.

Figure 16:
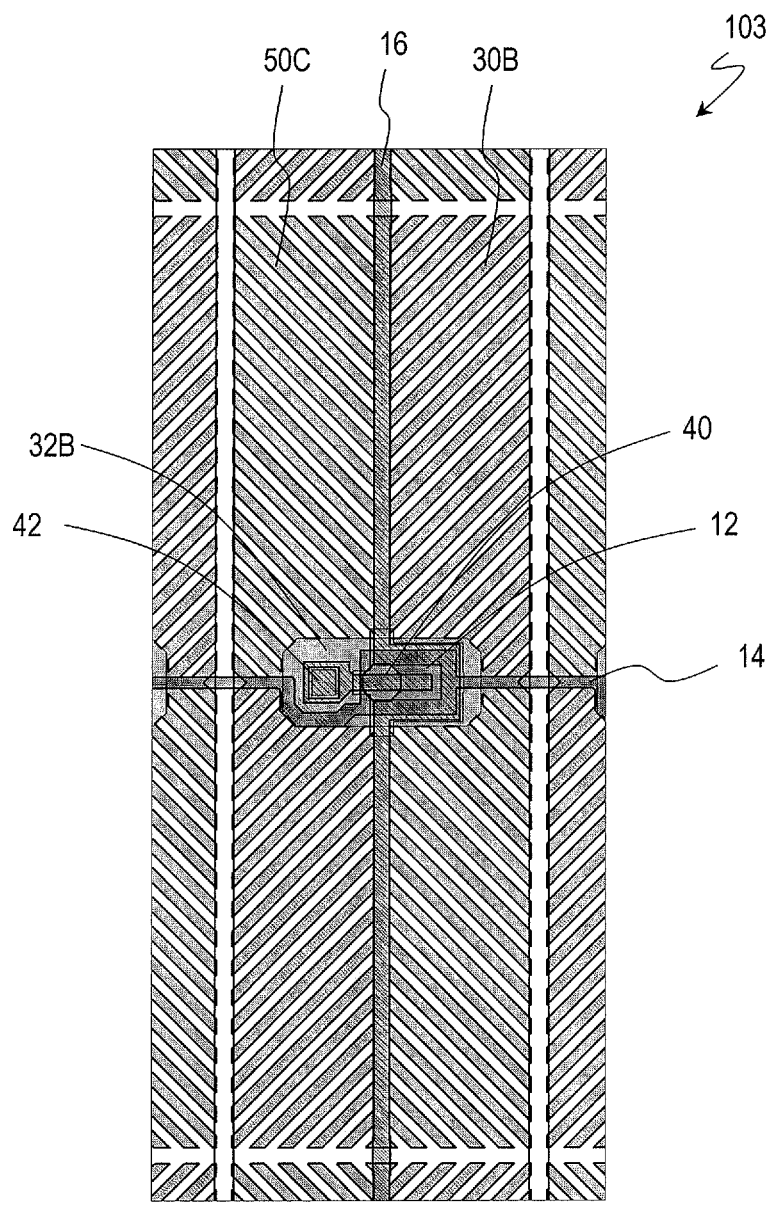
FIG. 16 A plan view showing a configuration of a pixel 50C of a liquid crystal display device 103 of Embodiment 4 of the present invention.

FIG. 16 is a plan view showing a configuration of a pixel 50C of the liquid crystal display device 103. FIG. 17 is a plan view showing the wiring configuration lying under a pixel electrode 30B in the pixel 50C. FIG. 18 is a plan view schematically showing the shape of the pixel electrode 30B. Note that FIG. 18 shows not only the location of the pixel electrode 30B but also the location of a spacer 40.

Figure 17:
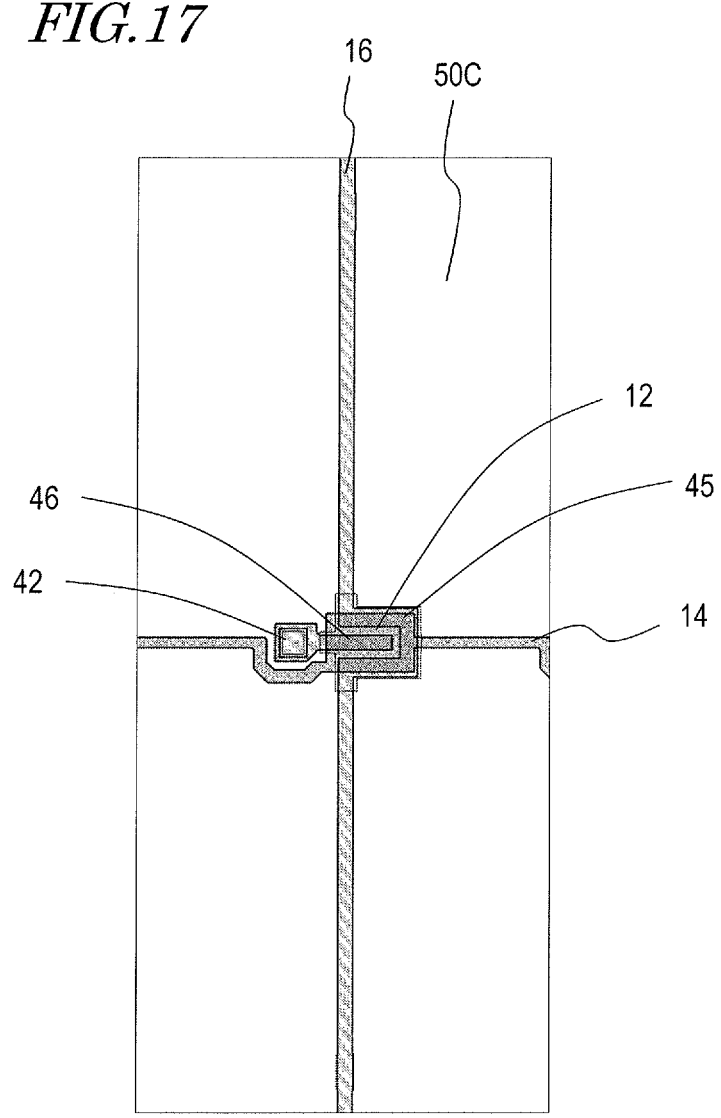
FIG. 17 A plan view showing the wiring configuration in the pixel 50C.
Figure 18:
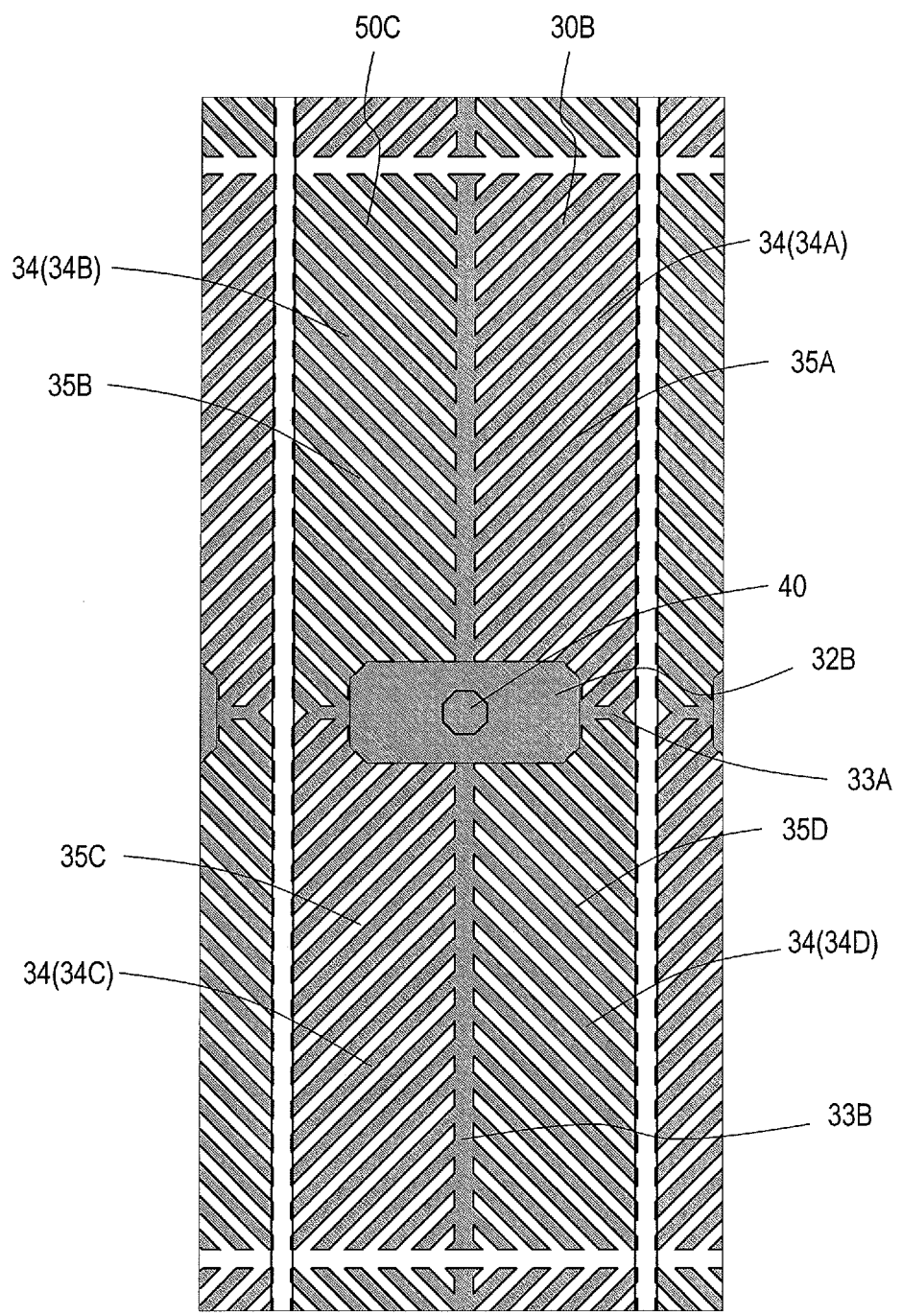
FIG. 18 A plan view showing the shape of the pixel electrode 30B of the liquid crystal display device 103.
Figure 19:
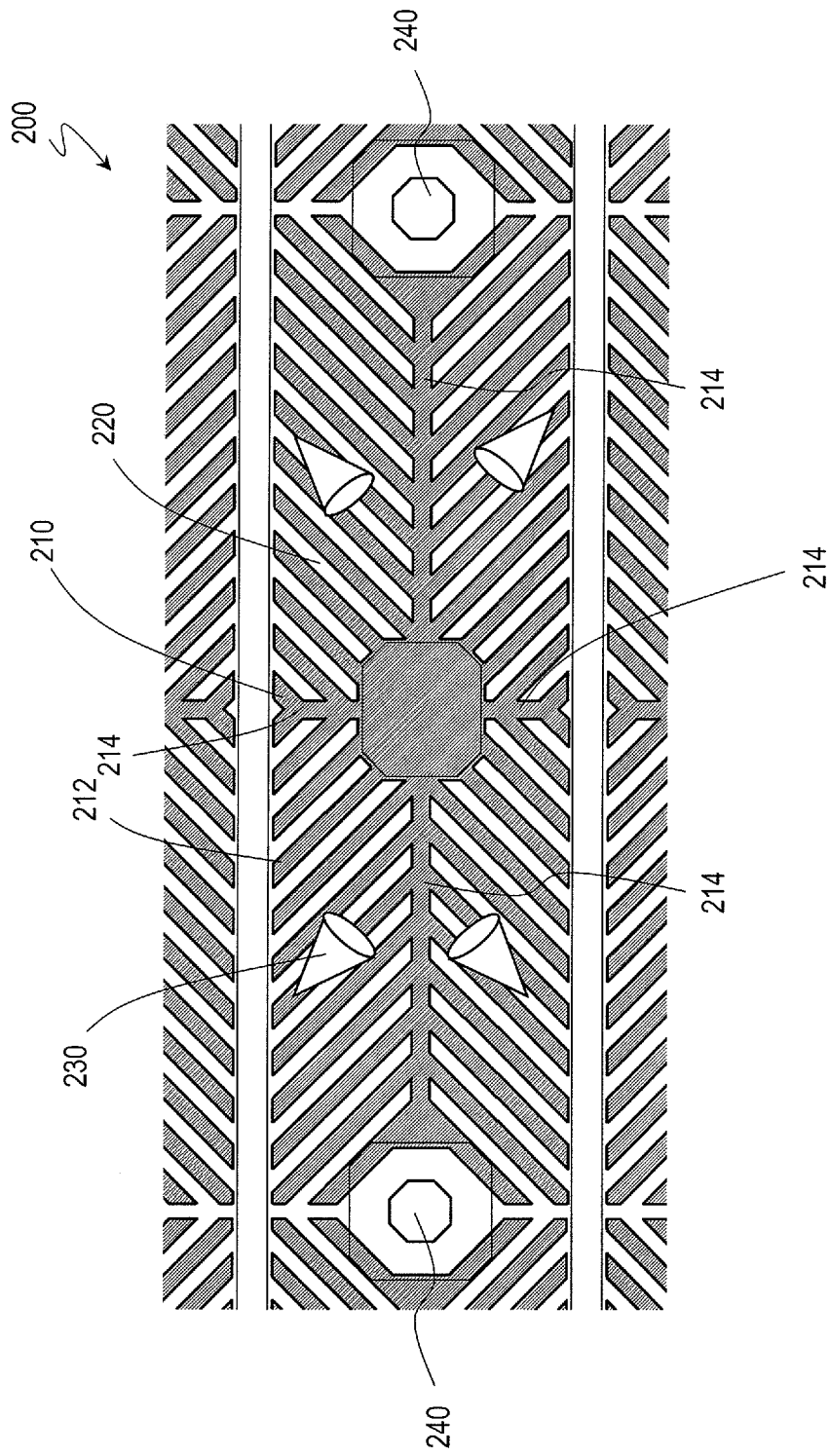
FIG. 19 A plan view showing an example of a vertical alignment type liquid crystal display device 200 which includes a fishbone-like pixel electrode 210.

As seen from FIG. 16 to FIG. 18, the liquid crystal display device 103 of Embodiment 4 is realized by vertically elongating the configuration of the pixel 50B and the shape of the pixel electrode 30A of Embodiment 3. Although the lengths of the scan line 14 and the signal line 16 in the pixel 50C are different, the configurations of the TFT 12, the spacer 40, the contact hole 42, the island electrode, and the black matrix 54A are the same as those of Embodiment 3. The width along the X direction and the width along the Y direction of the pixel 50C are, for example, 100 μm and 300 μm, respectively.

Embodiment 4 can also achieve the same effects as those achieved by Embodiment 3.

INDUSTRIAL APPLICABILITY

The present invention can be employed for improving the display characteristics of a vertical alignment type liquid crystal display device.

REFERENCE SIGNS LIST

10 TFT substrate
11 substrate
12 TFT
13 color filter
14 scan line
15 gate insulating film
16 signal line
17 semiconductor layer
18 storage capacitor line
19 storage capacitor counter electrode
20 counter substrate
21 liquid crystal layer
22 scan line driving circuit
23 signal line driving circuit
24 control circuit
25 common electrode (counter electrode)
26, 27 polarizer
28 backlight unit
30, 30A, 30B pixel electrode
32, 32A, 32B island electrode
33A, 33B trunk electrode (trunk portion)
34 branch electrode (branch portion)

34A-34D first to fourth branch portions
35A-35D domains (first to fourth regions)
40 spacer
42 contact hole
43 protective insulating film (insulating layer)
44 interlayer insulating film (insulating layer)
45 source electrode
46 drain electrode
48, 49 absorption axis
50, 50A, 50B, 50C pixel
52 liquid crystal
54, 54A black matrix (BM, light blocking film)
55 storage capacitor electrode
56 opening
57, 58 protection film
100 liquid crystal display device (Embodiment 1)
101 liquid crystal display device (Embodiment 2)
102 liquid crystal display device (Embodiment 3)
103 liquid crystal display device (Embodiment 4)
200 liquid crystal display device
210 pixel electrode
212 branch electrode
214 trunk electrode
220 slit
230 liquid crystal
240 spacer

The invention claimed is:

1. A liquid crystal display device, comprising:
a first substrate which includes a pixel electrode provided in a pixel;
a second substrate which includes a counter electrode provided opposite to the pixel electrode;
a liquid crystal layer which is provided between the first substrate and the second substrate, the liquid crystal layer including a liquid crystal that has a negative dielectric anisotropy; and
a spacer which is provided between the first substrate and the second substrate,
wherein the pixel electrode includes a first portion which is formed by a plurality of first branch portions extending in a first direction, a second portion which is formed by a plurality of second branch portions extending in a second direction, a third portion which is formed by a plurality of third branch portions extending in a third direction, and a fourth portion which is formed by a plurality of fourth branch portions extending in a fourth direction,
the first direction, the second direction, the third direction, and the fourth direction are different directions from one another,
the spacer is provided at a position in the pixel which is surrounded by the first portion, the second portion, the third portion, and the fourth portion of the pixel electrode when viewed from a direction perpendicular to a plane of the first substrate,
when a voltage is applied between the pixel electrode and the counter electrode, a first region in which the liquid crystal is aligned along the first branch portions, a second region in which the liquid crystal is aligned along the second branch portions, a third region in which the liquid crystal is aligned along the third branch portions, and a fourth region in which the liquid crystal is aligned along the fourth branch portions are formed by the plurality of first branch portions, the plurality of second branch portions, the plurality of third branch portions, and the plurality of fourth branch portions,
the first substrate includes a TFT which is provided in the pixel, and
the spacer is provided at a position so as to overlap the TFT when viewed from a direction perpendicular to a plane of the first substrate.

2. The liquid crystal display device of claim 1, wherein the second substrate includes a light blocking film which is provided at a position so as to overlap the spacer and the TFT when viewed from a direction perpendicular to a plane of the first substrate.

3. The liquid crystal display device of claim 1, wherein
the first substrate includes a signal line for supplying a display signal to the pixel electrode,
the pixel electrode includes a first trunk portion extending in a fifth direction that is different from either of the first to fourth directions,
the plurality of first branch portions, the plurality of second branch portions, the plurality of third branch portions, or the plurality of fourth branch portions are branching off from the first trunk portion, and
the signal line is provided at a position so as to overlap the first trunk portion when viewed from a direction perpendicular to a plane of the first substrate.

4. The liquid crystal display device of claim 3, wherein
the first substrate includes a scan line for supplying a gate signal to the TFT,
the pixel electrode includes a second trunk portion extending in a sixth direction that is different from either of the first to fourth directions,
the plurality of first branch portions, the plurality of second branch portions, the plurality of third branch portions, or the plurality of fourth branch portions are branching off from the second trunk portion, and
the scan line is provided at a position so as to overlap the second trunk portion when viewed from a direction perpendicular to a plane of the first substrate.

5. The liquid crystal display device of claim 4, wherein the spacer is provided at a position so as to overlap a portion where the first trunk portion and the second trunk portion intersect with each other or a portion where an extension line of the first trunk portion and an extension line of the second trunk portion intersect with each other when viewed from a direction perpendicular to a plane of the first substrate.

6. The liquid crystal display device of claim 2, wherein
the first substrate includes an insulating layer,
the pixel electrode and a drain electrode of the TFT are electrically coupled to each other via a contact hole which is formed in the insulating layer, and
the contact hole is provided at a position so as not to overlap the light blocking film when viewed from a direction perpendicular to a plane of the first substrate.

7. The liquid crystal display device of claim 6, wherein the pixel has a rectangular shape when viewed from a direction perpendicular to a plane of the first substrate, and the contact hole is provided at the center of a short side of the pixel.

8. The liquid crystal display device of claim 1, wherein
the first substrate includes a storage capacitor line which is provided in a peripheral region of the pixel and a storage capacitor counter electrode which is electrically coupled to a drain electrode of the TFT, and
the storage capacitor line and the storage capacitor counter electrode overlap each other when viewed from a direction perpendicular to a plane of the first substrate.

9. The liquid crystal display device of claim 2, wherein the pixel electrode includes an island electrode which is provided so as to cover the TFT.

10. The liquid crystal display device of claim 2, wherein
the first substrate includes an insulating layer,
the pixel electrode and a drain electrode of the TFT are electrically coupled via a contact hole formed in the insulating layer, and
the contact hole is provided at a position so as to overlap the light blocking film when viewed from a direction perpendicular to a plane of the first substrate.

11. The liquid crystal display device of claim 10, wherein the pixel electrode includes an island electrode which is provided so as to cover the TFT, and the island electrode is provided so as to cover the contact hole.

12. The liquid crystal display device of claim 10, wherein
the first substrate includes a storage capacitor line which is provided in a peripheral region of the pixel, and
part of the storage capacitor line and part of the first portion, the second portion, the third portion, and the fourth portion of the pixel electrode overlap each other when viewed from a direction perpendicular to a plane of the first substrate.

13. The liquid crystal display device of claim 10, wherein the first substrate includes a transparent electrode which is provided on a side of the pixel electrode which is opposite to the liquid crystal layer.

14. The liquid crystal display device of claim 13, wherein
the transparent electrode has an opening, and
the contact hole is provided inside the opening when viewed from a direction perpendicular to a plane of the first substrate.

* * * * *